US008855445B2

(12) United States Patent
Yamada

(10) Patent No.: US 8,855,445 B2
(45) Date of Patent: Oct. 7, 2014

(54) IMAGE PROCESSING APPARATUS

(71) Applicant: Ryuji Yamada, Ogaki (JP)

(72) Inventor: Ryuji Yamada, Ogaki (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 56 days.

(21) Appl. No.: 13/763,983

(22) Filed: Feb. 11, 2013

(65) Prior Publication Data

US 2013/0223765 A1 Aug. 29, 2013

(30) Foreign Application Priority Data

Feb. 28, 2012 (JP) ................................. 2012-042224

(51) Int. Cl.
*G06K 9/32* (2006.01)
*G06K 15/02* (2006.01)
*G06T 3/40* (2006.01)

(52) U.S. Cl.
CPC ........................................ *G06T 3/40* (2013.01)
USPC ............................. 382/298; 382/299; 358/1.2

(58) Field of Classification Search
CPC .................................................... G06T 3/4076
See application file for complete search history.

(56) References Cited

U.S. PATENT DOCUMENTS

| 5,742,300 | A | 4/1998 | Klassen | |
|---|---|---|---|---|
| 6,587,602 | B2 * | 7/2003 | Wakisawa et al. | 382/298 |
| 7,773,830 | B2 * | 8/2010 | Nohara | 382/296 |
| 8,400,473 | B2 * | 3/2013 | Shamir et al. | 345/647 |
| 8,428,395 | B2 * | 4/2013 | Matsuda | 382/299 |
| 8,472,753 | B2 * | 6/2013 | Bucha et al. | 382/298 |
| 8,483,513 | B2 * | 7/2013 | Liang | 382/298 |
| 8,571,309 | B2 * | 10/2013 | Krishnan et al. | 382/162 |
| 2003/0202195 | A1 | 10/2003 | Ito | |
| 2009/0316022 | A1 * | 12/2009 | Hatano | 382/298 |
| 2011/0150364 | A1 * | 6/2011 | Shimizu et al. | 382/298 |
| 2013/0222818 | A1 * | 8/2013 | Yamada | 358/1.2 |

FOREIGN PATENT DOCUMENTS

| JP | 08-258255 A | 10/1996 |
|---|---|---|
| JP | 2003-319182 A | 11/2003 |

* cited by examiner

*Primary Examiner* — Anand Bhatnagar
*Assistant Examiner* — Soo Park
(74) *Attorney, Agent, or Firm* — Scully, Scott, Murphy & Presser, P.C.

(57) ABSTRACT

An image processing apparatus includes: an acquisition unit configured to acquire original image data expressing an original image that comprises a first type pixel and a second type pixel; and an enlargement processing unit configured to execute enlargement processing for the original image data to generate enlarged image data expressing an enlarged image that is obtained by enlarging the original image in a first direction. The enlargement processing unit includes: a pixel group selection unit configured to select a pixel group extending in a second direction intersecting with the first direction in the enlarge image when a specific pattern configured by the first type pixel and the second type pixel is included in the original image; and a setting unit configured to set a pixel configuring the pixel group in the enlarged image as the second type pixel.

20 Claims, 17 Drawing Sheets

FIG. 5

| REFERENCE FLAG OFF | DATA AMOUNT | COMPRESSED LINE DATA | REFERENCE FLAG ON | REFERENCE FLAG OFF | DATA AMOUNT | COMPRESSED LINE DATA | REFERENCE FLAG ON | ... |
|---|---|---|---|---|---|---|---|---|
| 310A | 320 | 330 | 310B | 310A | 320 | 330 | 310B | |
| FIRST LINE | | | SECOND LINE | THIRD LINE | | | FOURTH LINE | |

300

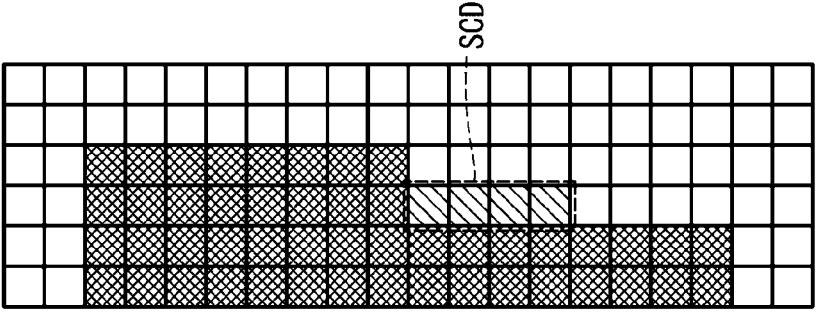
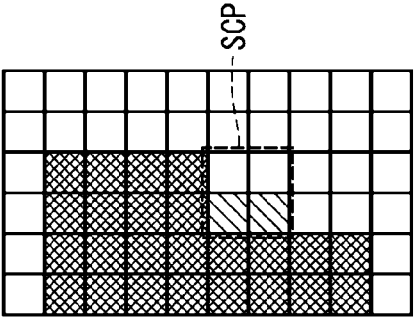
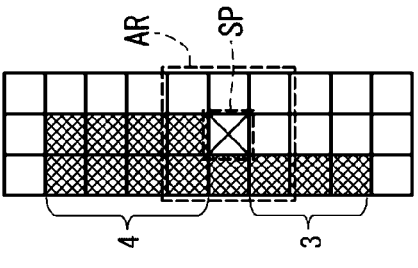

CL=7, CU=4 (CL>CU), SC=3

CL=4, CU=4 (CL=CU), SC=2

CL=1, CU=1 SC=1

CL=2, CU=4 (CL<CU), SC=1

CL=1, CU=4 (CL=1), SC=1

NON SUPPLEMENT TARGET

CL=4, CU=1 (CU=1), SC=1

LATERAL ENLARGEMENT PROCESSING

FIG. 18

| | SPECIFIC PATTERN | FIRST CONTINUOUS NUMBER CL | | SECOND CONTINUOUS NUMBER CU | | SUPPLEMENT DIRECTION SD | SUPPLEMENT PATTERN SDP |
|---|---|---|---|---|---|---|---|
| | | FIRST PATTERN LCP | COUNT DIRECTION CD1 | SECOND PATTERN UCP | COUNT DIRECTION CD2 | | |
| 1 | UP1, MP1, BP1 | LCP1 | ← | UCP1 | → | ← | SDP1 |
| 2 | UP2, MP2, BP2 | LCP2 | → | UCP2 | ← | → | SDP2 |
| 3 | UP3, MP3, BP3 | LCP3 | ← | UCP3 | → | ← | SDP3 |
| 4 | UP4, MP4, BP4 | LCP4 | → | UCP4 | ← | → | SDP4 |

IMAGE PROCESSING APPARATUS

CROSS-REFERENCE TO RELATED APPLICATIONS

This application claims priority from Japanese Patent Application No. 2012-042224 filed on Feb. 28, 2012, the entire subject matter of which is incorporated herein by reference.

TECHNICAL FIELD

The invention relates to image processing including enlargement processing.

BACKGROUND

An image processing apparatus may execute enlargement processing of enlarging a size of an original image by using original image data expressing the original image and generate enlarged image data. For example, when the enlargement processing is executed upon printing, it is possible to print a relatively large print image even though the original image is relatively small.

SUMMARY

Illustrative aspects of the invention improve an appearance of an edge in an enlarged image after enlargement processing.

According to one illustrative aspect of the invention, there is provided an image processing apparatus comprising: a processor configured to operate as: an acquisition unit configured to acquire original image data expressing an original image that comprises a first type pixel and a second type pixel; and an enlargement processing unit configured to execute enlargement processing for the original image data to generate enlarged image data expressing an enlarged image that is obtained by enlarging the original image in a first direction. The enlargement processing unit comprises: a pixel group selection unit and a setting unit. The pixel group selection unit is configured to select a pixel group extending in a second direction intersecting with the first direction in the enlarge image when a specific pattern configured by the first type pixel and the second type pixel is included in the original image. The pixel group in the enlarged image comprises: a corresponding specific pixel corresponding to a specific pixel in the original image; and a pixel positioned in the second direction of the corresponding specific pixel. The specific pixel in the original image is a pixel corresponding to the specific first type pixel configuring the specific pattern. The number of pixels configuring the pixel group in the enlarged image being a number corresponding to a first continuous number and a second continuous number, the first continuous number being a number that a first pattern continues from the specific pixel toward the second direction in the original image, and the second continuous number being a number that a second pattern continues from the specific pixel toward an opposite direction to the second direction. The setting unit is configured to set a pixel configuring the pixel group in the enlarged image as the second type pixel.

BRIEF DESCRIPTION OF THE DRAWINGS

FIG. 5 is a conceptual view showing compressed dot data;
FIGS. 12(A)-12(C) illustrate the edge supplement processing;
FIG. 18 illustrates specific patterns and patterns for count in the lateral enlargement processing of the modified exemplary embodiment.

DETAILED DESCRIPTION

<General Overview>

Figure 1:
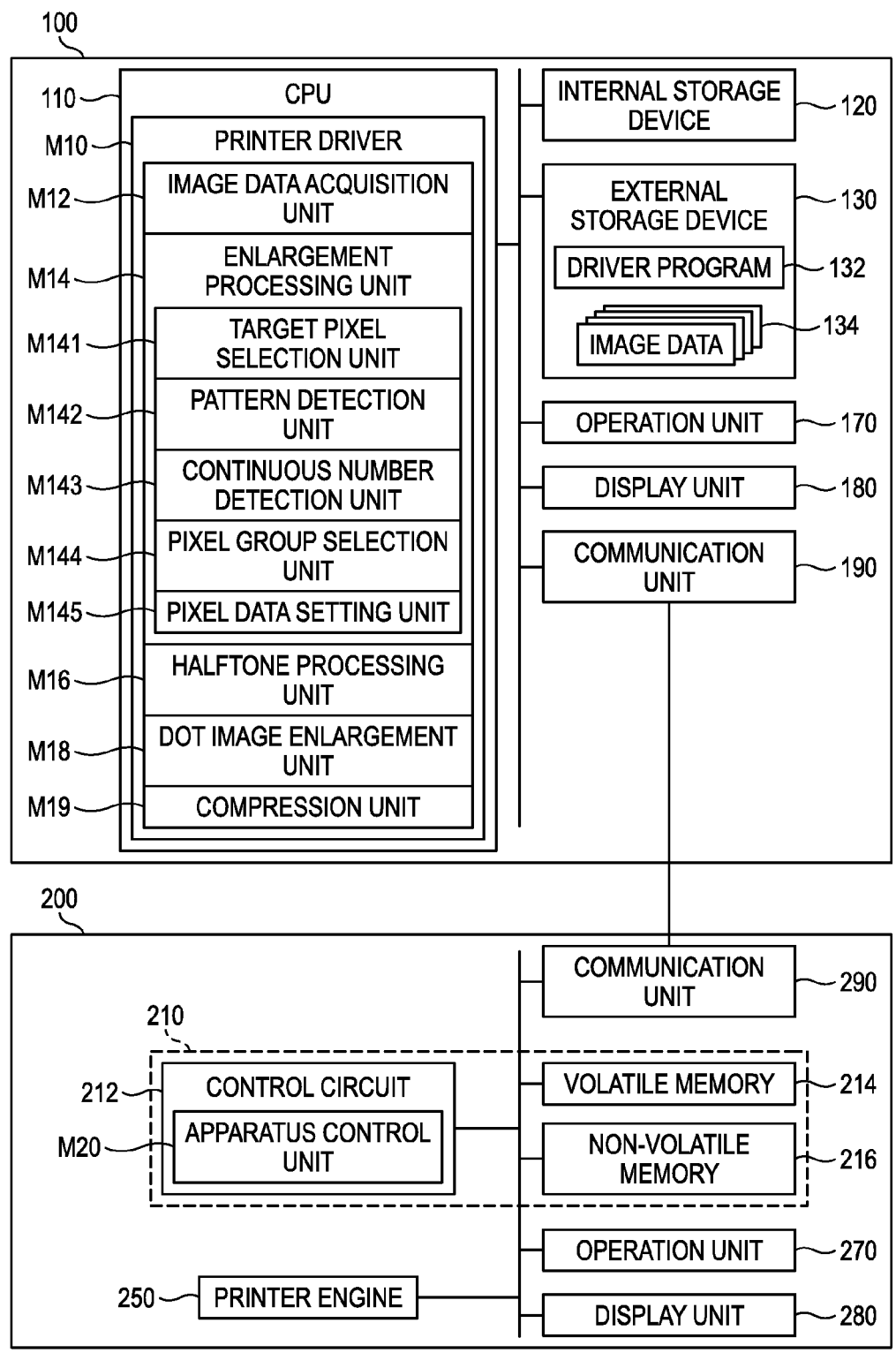
FIG. 1 is a block diagram of a computing apparatus and a printing apparatus according to an exemplary embodiment.

In a related-art technology, when the enlargement processing is executed, an appearance of an edge may be deteriorated in the enlarged image. For example, for an enlarged image that is obtained by enlarging twice an original image in a lateral direction, a step of one pixel in a lateral direction in the original image becomes a step of two pixels. Thus, a backlash of an edge including the corresponding step may be conspicuous.

Therefore, illustrative aspects of the invention improve an appearance of an edge in an enlarged image after enlargement processing.

According to a first illustrative aspect of the invention, there is provided an image processing apparatus comprising: a processor configured to operate as: an acquisition unit configured to acquire original image data expressing an original image that comprises a first type pixel and a second type pixel; and an enlargement processing unit configured to execute enlargement processing for the original image data to generate enlarged image data expressing an enlarged image that is obtained by enlarging the original image in a first direction, wherein the enlargement processing unit comprises: a pixel group selection unit configured to select a pixel group extending in a second direction intersecting with the first direction in the enlarge image when a specific pattern configured by the first type pixel and the second type pixel is included in the original image, wherein the pixel group in the enlarged image comprises: a corresponding specific pixel corresponding to a specific pixel in the original image; and a pixel positioned in the second direction of the corresponding specific pixel, wherein the specific pixel in the original image is a pixel corresponding to the specific first type pixel configuring the specific pattern, and wherein the number of pixels configuring the pixel group in the enlarged image being a number corresponding to a first continuous number and a second continuous number, the first continuous number being a number that a first pattern continues from the specific pixel toward the second direction in the original image, and the second continuous number being a number that a second pattern continues from the specific pixel toward an opposite direction to the second direction; and a setting unit configured to set a pixel configuring the pixel group in the enlarged image as the second type pixel.

According thereto, the pixel group in the enlarged image is selected which includes a pixel corresponding to the specific pixel that is the first type pixel configuring the specific pattern of the original image and the selected pixel group is set as the second type pixel. The number of pixels configuring the pixel group is a number corresponding to the first continuous number and the second continuous number. As a result, it is possible to improve an appearance of an enlarged image edge corresponding to the specific pattern, considering a surrounding image of the specific pattern of the original image.

According to a second illustrative aspect of the invention, in the image processing apparatus according to the first illustrative aspect, wherein the first pattern comprises: a first central pixel that is the first type pixel; a first adjacency pixel that is the first type pixel adjacent to the first central pixel in the first direction; and a second adjacency pixel that is the second type pixel adjacent to the first central pixel in an opposite direction to the first direction, wherein the second pattern comprises: a second central pixel that is the second type pixel; and a third adjacency pixel that is the first type pixel adjacent to the second central pixel in the first direction, and wherein a position of the first central pixel in the first direction and a position of the second central pixel in the first direction are the same as a position of the specific pixel in the first direction in the original image.

According thereto, it is possible to appropriately set the number of pixels configuring the pixel group.

According to a third illustrative aspect of the invention, in the image processing apparatus according to the first or second illustrative aspect, wherein the first pattern is a first partial pattern that is a part of the specific pattern, and wherein the second pattern is a second partial pattern that is a part of the specific pattern and is different from the first partial pattern.

According thereto, it is possible to appropriately select an edge which appearance is to be improved and to improve the appearance of the edge.

According to a fourth illustrative aspect of the invention, in the image processing apparatus according to any one of the first to third illustrative aspects, wherein the specific pattern comprises: a first partial pattern that is adjacent to the specific pixel in the second direction; and a second partial pattern that is adjacent to the specific pixel in an opposite direction to the second direction, wherein the first partial pattern comprises: a central pixel that is adjacent to the specific pixel in the second direction; a first surrounding pixel that is the first type pixel adjacent to the central pixel in the first direction; and a second surrounding pixel that is the second type pixel adjacent to the central pixel in an opposite direction to the first direction, and wherein the second partial pattern comprises: a third surrounding pixel that is the second type pixel adjacent to the specific pixel in an opposite direction to the second direction; and a fourth surrounding pixel that is the first type pixel adjacent to the third surrounding pixel in the first direction.

According thereto, it is possible to appropriately select an edge which appearance is to be improved and to improve the appearance of the edge.

According to a fifth illustrative aspect of the invention, in the image processing apparatus according to any one of the first to fourth illustrative aspects, wherein the enlargement processing unit further comprises a determination unit, wherein the determination unit is configured to determine the number of pixels configuring the pixel group by using the second continuous number when the first continuous number is larger than the second continuous number, and wherein the determination unit is configured to determine the number of pixels configuring the pixel group by using the first continuous number when the first continuous number is smaller than the second continuous number.

According thereto, it is possible to appropriately set the number of pixels configuring the pixel group.

According to a sixth illustrative aspect of the invention, in the image processing apparatus according to any one of the first to fifth illustrative aspects, wherein the enlargement processing unit further comprises a target pixel selection unit configured to sequentially select a target pixel from a plurality of pixels configuring the original image, wherein the enlargement processing unit is configured to execute one of a plurality of processing comprising first processing and second processing whenever the target pixel is sequentially selected and to generate the enlarged image data, wherein when the target pixel includes the specific pixel, the enlargement processing unit is configured to execute the first processing, the first processing comprising selection of the pixel group by the pixel group selection unit and setting of the pixels configuring the pixel group by the setting unit, and wherein when the target pixel do not include the specific pixel, the enlargement processing unit is configured to execute the second processing that does not comprise the selection of the pixel group by the pixel group selection unit and the setting of the pixels configuring the pixel group by the setting unit.

According thereto, it is possible to easily prepare the enlarged image data capable of improving the appearance of the edge.

According to a seventh illustrative aspect of the invention, in the image processing apparatus according to any one of the first to sixth illustrative aspects, wherein the enlargement processing unit is configured to execute the enlargement processing for the original image having no distortion to generate the enlarged image data expressing the enlarged image having distortion, wherein the image processing apparatus is for a print execution unit configured to print a dot image, wherein the processor is further configured to operate as: a halftone processing unit configured to execute halftone processing for the enlarged image data expressing the enlarged image having distortion generated by the enlargement processing unit to generate dot data expressing a formation state of a dot for each pixel so as to generate distorted dot data expressing a distorted dot image having distortion; and a dot image enlargement unit configured to execute processing that is different from the enlargement processing for the distorted dot data to generate distortion-free dot data expressing a distortion-free dot image having no distortion in which the distorted dot image is enlarged at least in the second direction.

According thereto, it is possible to reduce a throughput of halftone processing for printing a distortion-free dot image and to improve an appearance of an edge in the printed distortion-free dot image.

According to an eighth illustrative aspect of the invention, in the image processing apparatus according to the seventh illustrative aspect, wherein the distortion-free dot image comprises a plurality of sets of the same lines, wherein the set of the same lines comprises two or more lines of a plurality of lines along the first direction configuring the distortion-free dot image, which two or more lines are adjacent to each other and have the same formation state of a dot of each composite pixel, wherein the distortion-free dot data comprises compressed data expressing the set of the same lines, and wherein the compressed data comprises: representative line data expressing one representative line; and data indicating that the representative line data repeats.

According thereto, it is possible to reduce a data amount of the distortion-free dot data.

According to a ninth illustrative aspect of the invention, in the image processing apparatus according to any one of the first to eighth illustrative aspects, wherein the enlargement processing unit further comprises a detection unit configured to detect the specific pattern in the original image, and wherein the enlargement processing unit is configured to execute selection of the pixel group by the pixel group selection unit and setting of the pixels configuring the pixel group by the setting unit for the detected specific pattern.

According to a tenth illustrative aspect of the invention, in the image processing apparatus according to any one of the first to eighth illustrative aspects, wherein the enlargement processing unit comprises a detection unit configured to detect a corresponding specific pattern, which corresponds to the specific pattern in the original image, in the enlarged image, and wherein the enlargement processing unit is configured to execute selection of the pixel group by the pixel group selection unit and setting of the pixels configuring the pixel group by the setting unit for the detected corresponding specific pattern.

The invention can be implemented in a variety of aspects such as a method that realizes functions of the apparatus, a computer program for implementing functions of the apparatus, a recording medium having the computer program recorded therein and the like.

EXEMPLARY EMBODIMENTS

Exemplary Embodiments of the invention will now be described with reference to the drawings.

(A-1) Configurations of Computing Apparatus 100 and Printing Apparatus 200

FIG. 1 is a block diagram of a computing apparatus 100 serving as an image processing apparatus of an exemplary embodiment and a printing apparatus 200 according to an exemplary embodiment.

The computing apparatus 100 is a computer (for example, PC) configured to communicate with the printing apparatus 200. The computing apparatus 100 includes a CPU 110, an internal storage device 120 such as RAM, ROM and the like, an external storage device 130 such as hard disk drive and the like, an operation unit 170 such as keyboard, mouse and the like, a display unit 180 such as liquid crystal monitor and the like, and a communication unit 190 including an interface for performing communication with an external apparatus (for example, the printing apparatus 200).

The external storage device 130 stores therein a driver program 132, which is an image processing program of this exemplary embodiment, and image data 134 prepared by an application program (not shown).

The CPU 110 is configured to implement functions of a printer driver M10 by executing the driver program 132. The printer driver M10 includes an image data acquisition unit M12, an enlargement processing unit M14, a halftone processing unit M16, a dot image enlargement unit M18 and a compression unit M19. The printer driver M10 is configured to execute image processing (which will be described later) of this exemplary embodiment. The enlargement processing unit M14 includes a target pixel selection unit M141, a pattern detection unit M142, a continuous number determination unit M143, a pixel group selection unit M144 and a pixel data setting unit M145.

The printing apparatus 200 includes an integrated circuit 210, a printer engine 250, an operation unit 270 such as buttons, a touch panel and the like, a display unit 280 such as liquid crystal panel and the like, and a communication unit 290 including an interface for performing communication with an external apparatus (for example, the computing apparatus 100).

The integrated circuit 210 is an ASIC (Application Specific Integrated Circuit), for example. The integrated circuit 210 includes a control circuit 212, a volatile memory 214 such as DRAM and the like, and a non-volatile memory 216 such as mask read-only memory, EEPROM and the like. The volatile memory 214 provides a buffer area that is used by the control circuit 212. The non-volatile memory 216 stores therein control data, a program and the like that are referred to by the control circuit 212. The control circuit 212 functions as an apparatus control unit M20 that is configured to overall control the printing apparatus 200. Incidentally, a part or all of the volatile memory 214 and the non-volatile memory 216 may be provided an outside of the integrated circuit 210.

The printer engine 250 is a mechanism unit configured to control the apparatus control unit M20 (integrated circuit 210) and to perform a printing operation in response to print data supplied from the apparatus control unit M20. The printer engine 250 implements a function of a monochrome laser printer that prints a dot image on a printing medium by using black toners serving as a print material. That is, the printer engine 250 is configured to implement an exposure process of exposing a photosensitive member by using laser, a developing process of attaching toners on an electrostatic latent image that is formed on the photosensitive member by the exposure process, a transfer process of transferring a developed toner image from the photosensitive member to a printing medium and a fixing process of fixing the transferred toner image on the printing medium. All of the apparatus control unit M20 and the printer engine 250 are examples of the print execution unit.

The driver program 132 configured to implement the functions of the printer driver M10 and the program configured to implement the functions of the apparatus control unit M20 may be provided with being stored in a computer-readable recording medium.

(A-2) Image Processing of Printer Driver M10

Figure 2:
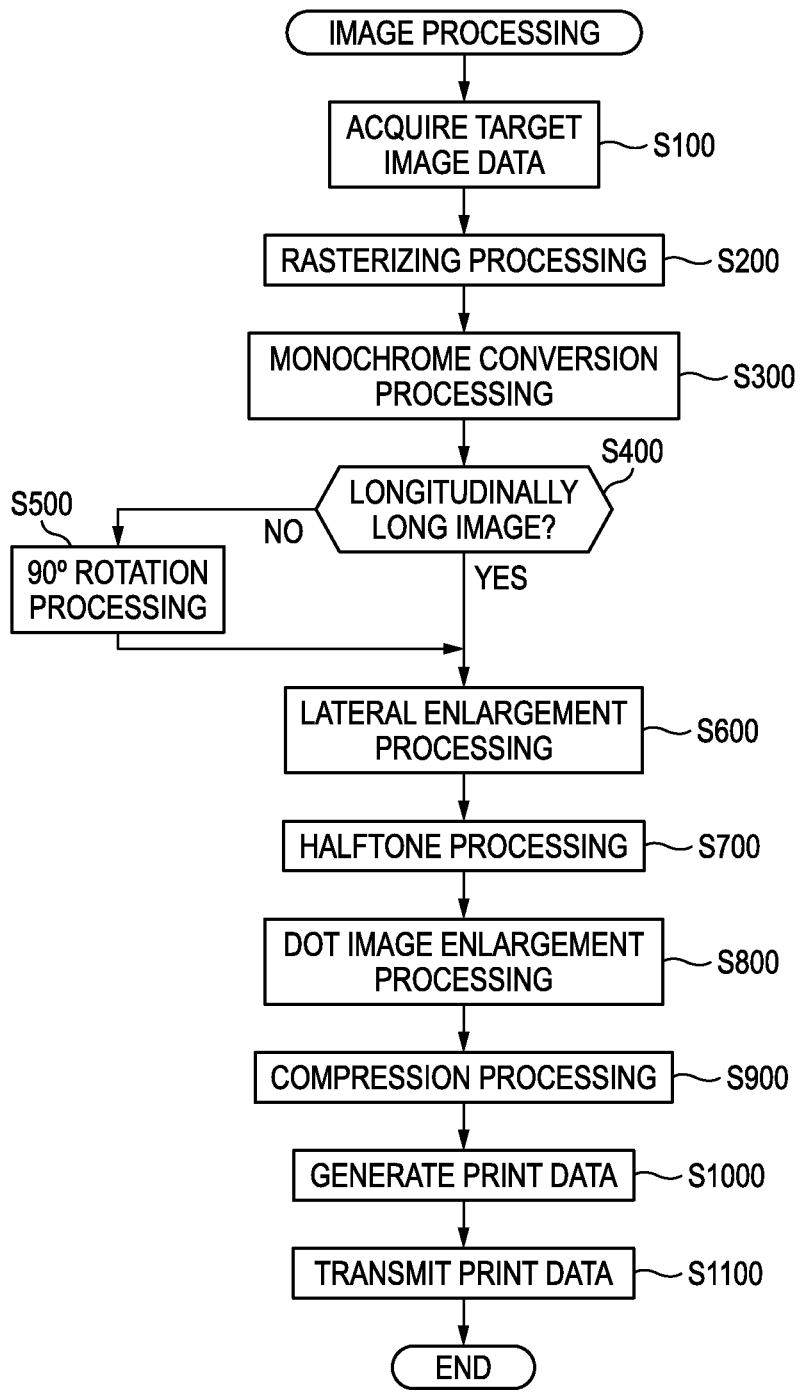
FIG. 2 is a flowchart of image processing.

FIG. 2 is a flowchart of image processing that is executed by the printer driver M10 of the computing apparatus 100. The image processing includes generating print data to be supplied to the printing apparatus 200 by using the image data 134. The printer driver M10 starts the image processing in response to a user's print instruction.

In step S100, the image data acquisition unit M12 of the printer driver M10 acquires image data (target image data) of a processing target. The target image data is, for example, the image data 134 (refer to FIG. 1) that has been described above, and is acquired from the application program that has prepared the image data 134. The target image data has a data format that is different for each application program having prepared the image data.

In step S200, the image data acquisition unit M12 executes rasterizing processing of converting the target image data into bitmap data (RGB image data) configured by RGB image data. The RGB image data includes gradation values (256 gradation) of respective color components of RGB.

In step S300, the image data acquisition unit M12 converts the RGB image data into bitmap data (monochromatic image data) configured by monochromatic pixel data indicating a density of a black component (monochrome conversion processing). In this exemplary embodiment, the monochromatic pixel data is a gradation value in a range of 0 to 255. A gradation value '0' indicates white, a gradation value '255' indicates black, and intermediate gradation values indicate gray that has a higher density as the value is larger. Specifically, the image data acquisition unit M12 calculates a brightness value Y of the RGB pixel data, for example. The image data acquisition unit M12 converts the brightness value Y into the monochromatic pixel data by using a look-up table.

In step S400, the image data acquisition unit M12 determines whether a monochromatic image expressed by the generated monochromatic image data is a longitudinally long image (portrait) or not, e.g., whether a pixel-number ratio S of the number of pixels in the lateral direction to the number of pixels in the longitudinal direction is smaller than 1. When it is determined that the monochromatic image is not a longitudinally long image, e.g., the monochromatic image is a laterally long image (landscape) (step S400: NO), the image data acquisition unit M12 executes rotation processing of rotating the monochromatic image by 90° and generates monochromatic image data expressing a longitudinally long monochromatic image (step S500). When it is determined that monochromatic image is a longitudinally long image (step S400: YES), the image data acquisition unit M12 proceeds to processing of step S600.

Figure 3:
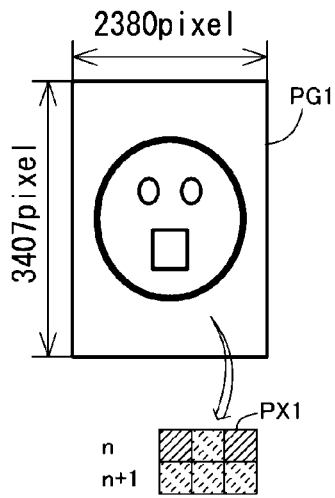
FIGS. 3(A)-3(D) are conceptual views illustrating the image processing.
Figure 3:
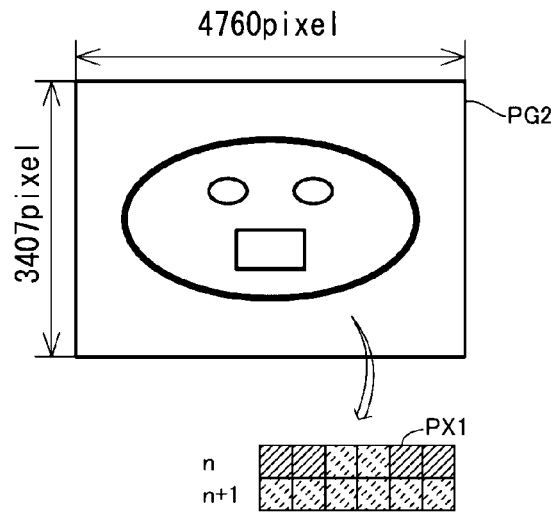
Figure 3:
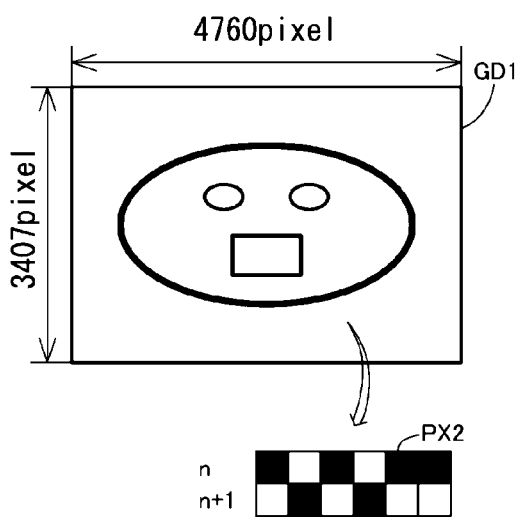
Figure 3:
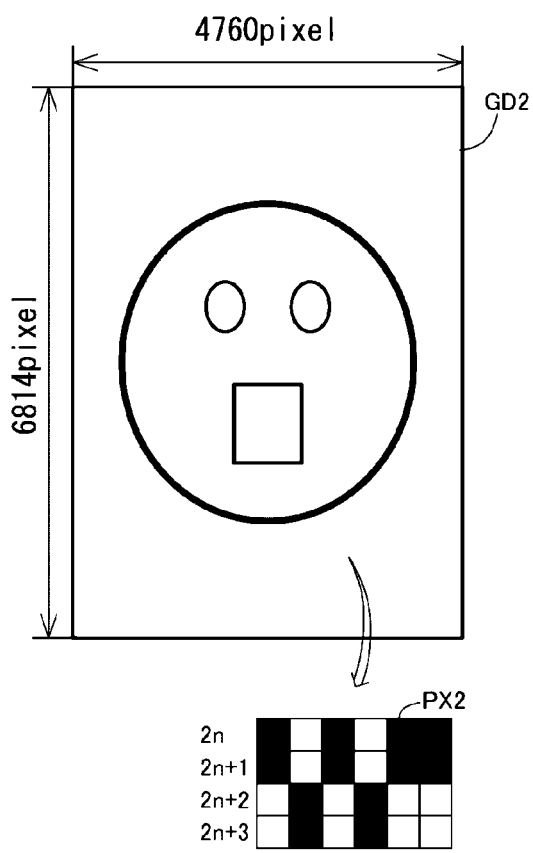

FIG. 3 is a conceptual view illustrating the image processing. FIG. 3(A) shows a monochromatic image PG1 expressed by the monochromatic image data (monochromatic image PG1 after the rotation processing when the 90° rotation processing is performed). In this exemplary embodiment, a size (number of pixels) of the monochromatic image PG1 is 3407 pixels long×2380 pixels wide. The pixel-number ratio S of the monochromatic image PG1 is about 0.70. The pixel-number ratio S is a ratio of the number of pixels in the lateral direction to the number of pixels in the longitudinal direction.

In step S600, the enlargement processing unit M14 of the printer driver M10 executes lateral enlargement processing of enlarging twice a lateral size of the monochromatic image PG1 for the monochromatic image data (enlarging twice the number of lateral pixels). By the lateral enlargement processing, enlarged monochromatic image data expressing an enlarged monochromatic image PG2 is generated. FIG. 3(B) shows the enlarged monochromatic image PG2. The lateral enlargement processing will be specifically described in the below.

The number of lateral pixels in the enlarged monochromatic image PG2 is twice as many as the number of lateral pixels in the monochromatic image PG1. In the example of FIG. 3(B), the number of lateral pixels in the enlarged monochromatic image PG2 is 4760 pixels. The number of longitudinal pixels in the enlarged monochromatic image PG2 is 3470 pixels and is the same as the number of longitudinal pixels in the monochromatic image PG1. That is, the pixel-number ratio S2 of the enlarged monochromatic image PG2 is twice as many as the pixel-number ratio S of the monochromatic image PG1 and is about 1.40 in the example of FIG. 3(B). Here, as shown in FIGS. 3(A) and 3(B), the enlarged monochromatic image PG2 is an image having distortion that is obtained by distorting the monochromatic image PG1 having no distortion. In the below, the monochromatic image PG1 is referred to as the distortion-free image PG1, and the enlarged monochromatic image PG2 is referred to as the distorted image PG2. Further, the monochromatic image data expressing the distortion-free image PG1 is referred to as distortion-free image data, and the enlarged monochromatic image data expressing the distorted image PG2 is referred to as distorted image data.

In step S700, the halftone processing unit M16 of the printer engine M10 executes halftone processing for the acquired distorted image data. The halftone processing is processing of generating dot data including a formation state of a dot for each pixel by using a dither matrix DM1 (refer to FIG. 5, which will be described later). Specifically, each pixel data configuring the dot data is binary data having any one of '1' indicating that a corresponding pixel forms a dot and '0' indicating that a corresponding pixel does not form a dot. By the halftone processing of this step, distorted dot data, which expresses a distorted dot image GD1 having distortion corresponding to the distorted image PG2 (refer to FIG. 3(B)), is generated. FIG. 3(C) shows an example of the distorted dot image GD1. The number of pixels in the longitudinal direction and the number of pixels in the lateral direction in the distorted dot image GD1 are the same as those of the distorted image PG2. Therefore, the pixel-number ratio of the distorted dot image GD1 is the same as the pixel-number ratio S2 of the distorted image PG2.

In step S800, the dot image enlargement unit M18 of the printer driver M10 executes dot image enlarging processing for the distorted dot data and generates distortion-free dot data expressing the distortion-free dot image GD2. FIG. 3(D) shows an example of the distortion-free dot image GD2.

Specifically, the dot image enlargement unit M18 inserts copy data of nth line data between the nth line data and (n+1)th line data configuring the distorted dot data, so as to generate the distortion-free dot data. Therefore, odd line data and even line data next to the odd line data in the distortion-free dot data are the same each other. Hence, as shown in FIGS. 3(C) and 3(D), each pixel data expressing each pixel PX2 of 2 nth line and each pixel data expressing each pixel PX2 of (2n+1)th line in the distortion-free dot image GD2 expressed by the distortion-free dot data are the same data (each pixel data expressing each pixel PX2 of nth line in the distorted dot image GD1). Further, each pixel data expressing each pixel PX2 of (2n+2)th line and each pixel data expressing each pixel PX2 of (2n+3)th line in the distortion-free dot image GD2 expressed by the distortion-free dot data are the same data (each pixel data expressing each pixel PX2 of (n+1)th line in the distorted dot image GD1).

The number of pixels in the longitudinal direction in the distortion-free dot image GD2 is twice (for example, 6814 pixels) as many as the number of pixels in the longitudinal direction in the distorted dot image GD1, the distortion-free image PG1 and the distorted image PG2. The number of pixels in the lateral direction in the distortion-free dot image GD2 is the same as the number of pixels in the lateral direction in the distorted dot image GD1 and the distorted image PG2 and is twice (for example, 4760 pixels) as many as the number of pixels in the lateral direction in the distortion-free image PG1. Therefore, the pixel-number ratio of the distortion-free dot image GD2 is the same as the pixel-number ratio S of the distortion-free image PG1 and is a half of the pixel-number ratio S2 of the distorted image PG2 and the distorted dot image GD1.

Here, a set of two or more lines of a plurality of lines configuring the distortion-free dot image, which are adjacent to each other and has the same formation state (pixel value of pixel data configuring dot data) of a dot of each composite pixel, like a set of (2n−1)th line and 2 nth line of the distortion-free dot image GD2, is referred to as a set of the same lines. Further, a set of line data indicating a set of the same lines, which is included in the distortion-free dot data, is referred to as a set of the same line data. When the number of pixels (the number of lines) in the longitudinal direction in the distortion-free dot image GD2 is N, the distortion-free dot image GD2 includes the (N/2) sets of the same lines.

Figure 4:
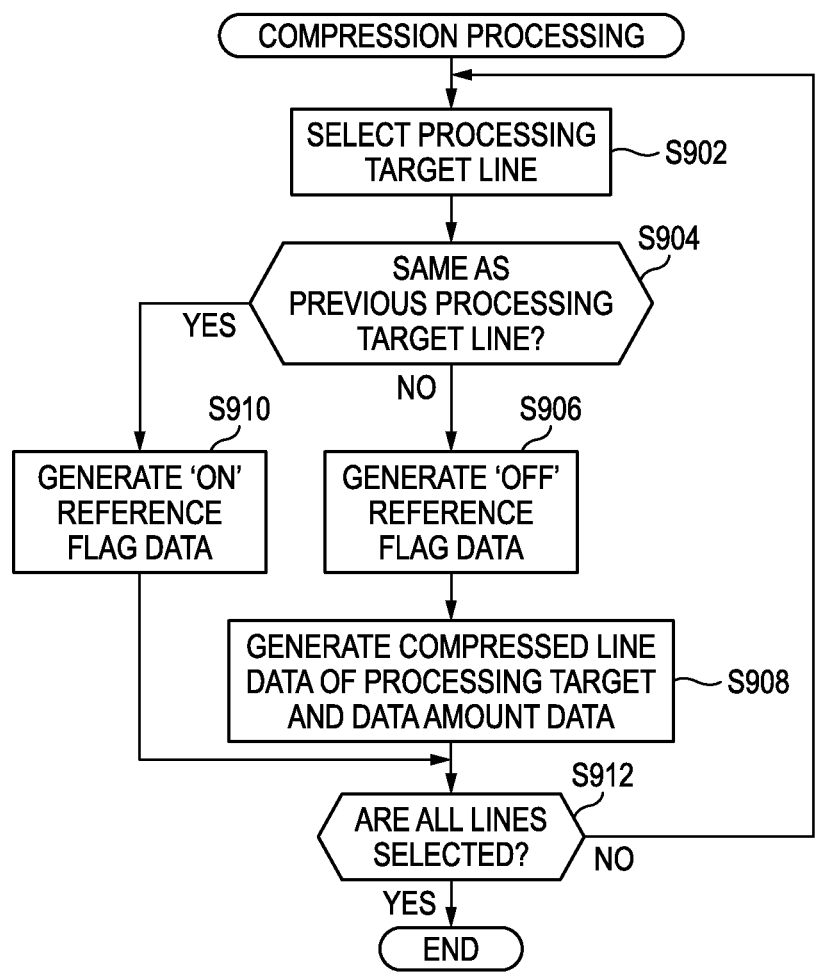
FIG. 4 is a flowchart of compression processing.

In step S900, the compression unit M19 of the printer driver M10 executes compression processing of compressing the distortion-free dot data, so as to generate compressed dot data 300. FIG. 4 is a flowchart of the compression processing. FIG. 5 is a view conceptually showing the compressed dot data 300.

In step S902, the compression unit M19 sequentially (specifically, in order from the upper in FIG. 3(D)) selects, as a processing target line, the line configuring the distortion-free dot image GD2 expressed by the distortion-free dot data that is a processing target. In step S904, the compression unit M19 determines whether the line data (processing target line data) of the processing target line is the same as the previous processing target line data. In this example, when an odd line is the processing target line, the processing target line data is not the same as the previous processing target line data. On the other hand, when an even line is the processing target line, the processing target line data is the same as the previous processing target line data.

When it is determined that the processing target line data is not the same as the previous processing target line data (S904: NO), the compression unit M19 generates reference flag data indicating an 'OFF' reference flag (step S906). In step S908, the compression unit M19 generates compressed line data and data amount data indicating a data amount of the compressed line data. The compression unit M19 compresses the processing target line data by run length compression, so as to generate the compressed line data.

When it is determined that processing target line data is the same as the previous processing target line data (S904: YES), the compression unit M19 generates reference flag data indicating an 'ON' reference flag (step S910).

In step S912, the compression unit M19 determines whether all the lines configuring the distortion-free dot image GD2, which is expressed by the distortion-free dot data that is the processing target, are selected as the processing target line. When all the lines are not selected as the processing target line (step S912: NO), the compression unit M19 returns to step S902 and repeats the processing of steps S904 to S910 while selecting a not-selected line as a new processing target line. When all the lines are selected as the processing target line (step S912: YES), the compression unit M19 ends the compression processing.

As shown in FIG. 5, the compressed dot data 300 generated by the compression processing includes data indicating each line of the distortion-free dot image GD2. The data indicating an odd line (for example, data of first and third lines, in FIG. 5) includes 'OFF' reference flag data 310A, data amount data 320 and compressed line data 330. The data indicating an even line (for example, data of second and fourth lines, in FIG. 5) includes 'ON' reference flag data 310B. The 'OFF' reference flag data 310A is a flag indicating that the data amount data 320 and the compressed line data 330 having a data amount indicated by the data amount data 320 continue from the 'OFF' reference flag data. The 'ON' reference flag data 310B is data indicating that the line indicated by the previous compressed lined data 330 repeats. Like this, when the line expressed by the same data repeats, the line data, which indicates the second line or later of the repeating lines, is replaced with the information ('ON' reference flag data 310B) indicating that the previous line data is referred to, so that the dot data is compressed. This processing is also referred to as 'pre-reference compression processing.'

As can be seen from the above descriptions, the set of the data 310A, 320, 330 indicating the odd line and the data 310B indicating the even line after the odd line is the compressed data indicating the set of the same lines and is the compressed data that is obtained by compressing the set of the same line data. It can be said that the compressed data indicating the set of the same lines includes: a set of representative line data (in this example, the data 310A, 320, 330 indicating the odd line) indicating one representative line; and the data (in this example, data 310B indicating the even line) indicating that the representative line data repeats.

In step S1000 of FIG. 2, the printer driver M10 adds a variety of printer control codes and data identification codes to the generated compressed dot data 300, so as to generate print data that can be interpreted by the apparatus control unit M20 (refer to FIG. 1) of the printing apparatus 200. In step S1100, the printer driver M10 transmits the generated print data to the printing apparatus 200 and ends the processing.

The apparatus control unit M20 (integrated circuit 210) of the printing apparatus 200 having received the print data stores the print data in the volatile memory 214. The apparatus control unit M20 restores the compressed dot data, which is included in the print data, by a predetermined amount (for example, by a specific number of lines), and sequentially supplies the same to the printer engine 250, so as to print the distortion-free dot image GD2.

(A-3) Dither Matrix DM1

Figure 6:
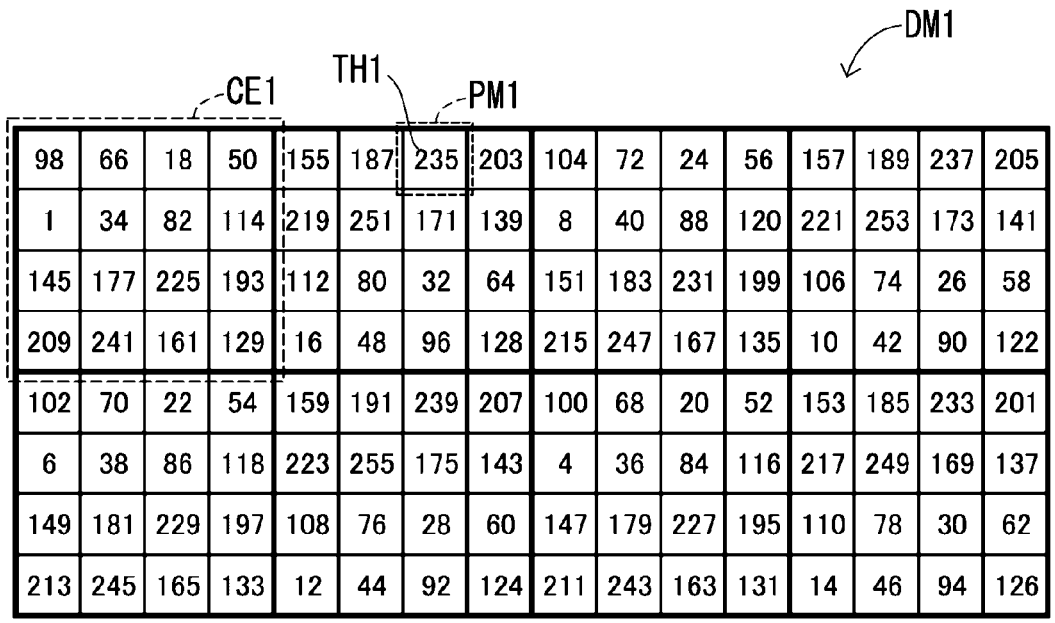
FIG. 6 shows a dither matrix.

FIG. 6 shows the dither matrix DM1. The dither matrix DM1 is made by arranging squares PM1 corresponding to the respective pixels (refer to FIG. 3(C)) of the distorted dot image GD1 by 8 lines long×16 columns wide (128 squares in total). The dither matrix DM1 includes 8 (eight) sub-matrixes (CE1) of 2 long×4 wide. Each of the sub-matrixes includes 16 (sixteen) squares PM1 of 4 lines long×4 columns wide. Each square PM1 has a threshold TH1 defined therein. In FIG. 6, the numbers shown in the respective squares PM1 indicate the thresholds TH1 set for the respective squares PM1. In this example, the 128 thresholds TH1 are set so that they are substantially equally distributed over an entire range (for example, 0 to 255) that the gradation values to be input can take. As a result, the distorted dot image GD1, which is expressed by the distorted dot data generated using the dither matrix DM1, can express 128 gradations within the range of 8 pixels long×16 pixels wide.

Figure 7:
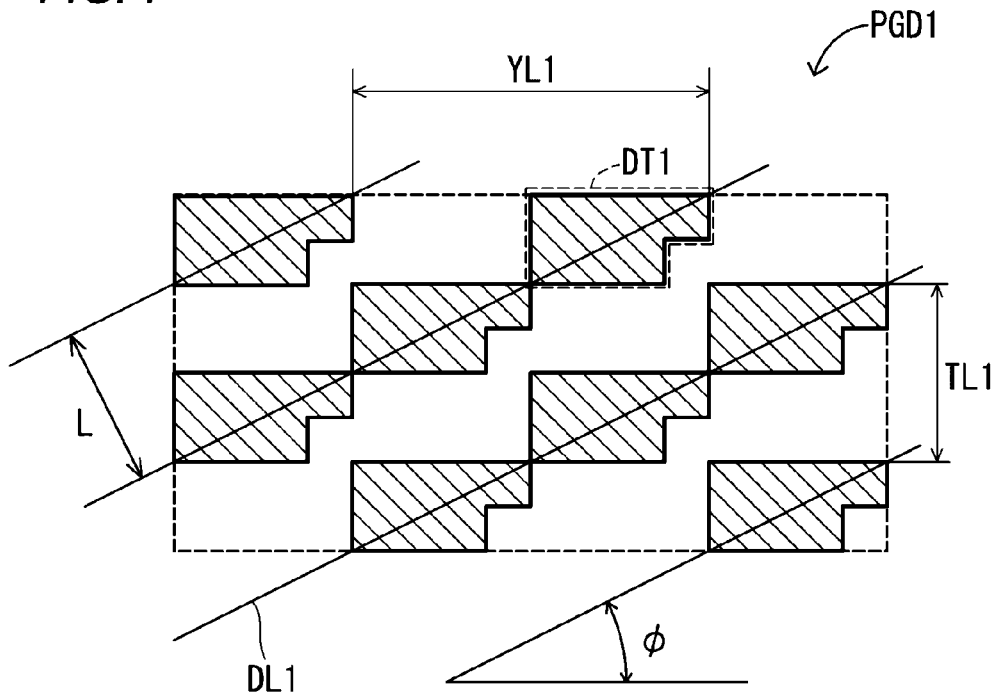
FIG. 7 illustrates a screen angle of the dither matrix.

FIG. 7 illustrates a screen angle of the dither matrix DM1. In a pictorial view of FIG. 7, areas corresponding to the squares PM1 having the threshold TH1 of 112 or smaller of the squares PM1 of the dither matrix DM1 are hatched and areas corresponding to the squares PM1 having the threshold TH1 of 113 or larger are white. It can be also said that FIG. 7 shows a partial distorted dot image PGD1 appearing in the distorted dot image GD1 expressed by the distorted dot data generated using the dither matrix DM1. That is, the partial distorted dot image PGD1 corresponds to the dot data in which the halftone processing has been performed for an image area of a predetermined density configured by the monochromatic pixel data having the gradation value of 112.

As can be seen from the partial distorted dot image PGD1 shown in FIG. 7, a set of dots DT1 corresponding to the sub-matrix CE1 of the dither matrix DM1 is expressed in the distorted dot image GD1. As can be seen from the solid line DL1 shown in FIG. 7, a plurality of dot lines, which is formed as a plurality of dots DT1 is connected, appears in the distorted dot image GD1. An angle of the dot line indicates a screen angle of the dither matrix DM1. In general, the screen angle φ is expressed by an angle from a three-o'clock direction (the right direction in FIG. 6) to the dot line in a counterclockwise direction. In this example, the screen angle φ is about 26.56°. The dot line is a line that is formed by a plurality of dots in accordance with a direction of the screen angle.

Figure 8:
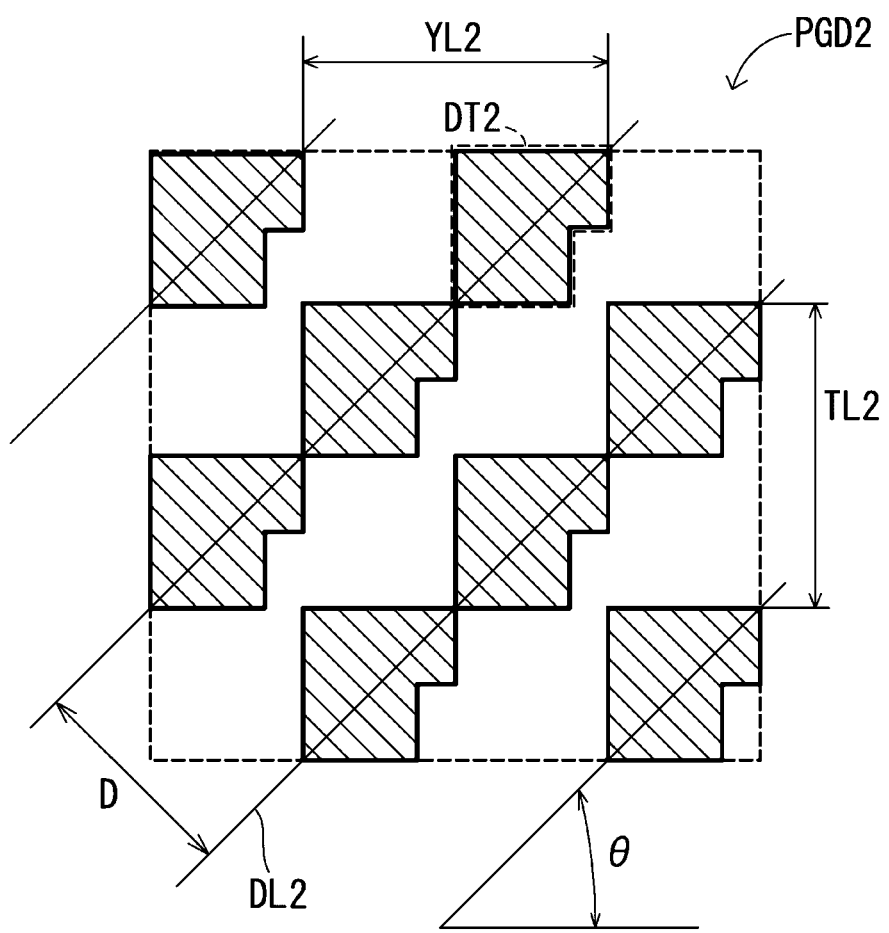
FIG. 8 illustrates a screen angle that appears in a distortion-free dot image.

FIG. 8 illustrates a screen angle that appears in the distortion-free dot image GD2 to be printed. FIG. 8 shows an area of the distortion-free dot image GD2 corresponding to the partial distorted dot image PGD1 shown in FIG. 7 (the area is also referred to as a partial distortion-free dot image PGD2).

As can be seen from the partial distortion-free dot image PGD2 shown in FIG. 8, a set of dots DT2 expressed in the distortion-free dot image GD2 is a shape that is obtained by enlarging twice the corresponding set of dots DT1 (refer to FIG. 7) expressed in the distorted dot image GD1 in the longitudinal direction. As can be seen from a solid line DL2 shown in FIG. 8, a plurality of dot lines, which is formed as a plurality of dots is connected, appears in the distortion-free dot image GD2. An angle of the dot line, e.g., a screen angle that appears in the distortion-free dot image GD2 to be printed is indicated by θ. In this example, the screen angle θ is about 45°.

A tangent (tan φ) of the screen angle φ (the screen angle appearing in the distorted dot image GD1) of the dither matrix DM1 is TL1/YL1. Here, TL1 indicates a longitudinal period (4 pixels (4 squares) in the example of FIG. 7) of a plurality of dot lines in the distorted dot image GD1. YL1 indicates a lateral period (8 pixels (8 squares) in the example of FIG. 7) of a plurality of dot lines in the distorted dot image GD1. A tangent (tan θ) of the screen angle θ appearing in the distortion-free dot image GD2 is TL2/YL2. Here, TL2 indicates a longitudinal period (8 pixels (8 squares) in the example of FIG. 8) of a plurality of dot lines in the distortion-free dot image GD2. YL2 indicates a lateral period (8 pixels (8 squares) in the example of FIG. 8) of a plurality of dot lines in the distortion-free dot image GD2. Since TL2=2×TL1 and YL1=YL2, tan φ=(tan θ)/2. Therefore, it can be said that the screen angle φ of the dither matrix DM1 is set to be about arctan((tan θ)/2).

A line interval L of a plurality of dot lines in the distorted dot image GD1 is expressed by cos φ×TL1. Further, a line interval D of a plurality of dot lines in the distortion-free dot image GD2 is expressed by cos θ×TL2. Hence, it can be said that the line interval L of the dot lines in the distorted dot image GD1 is set to be about L=(½)×D×cos φ/cos θ. Here, as described above, φ=arctan((tan θ)/2). In this exemplary embodiment, the line interval L in the distorted dot image GD1 is about 3.16 pixels, and the line interval D in the distortion-free dot image GD2 is about 5.66 pixels in which a pixel of the dot image corresponding to one square PM1 of the dither matrix DM1 is a unit.

The lines per inch (LPI), which are determined based on the screen angle θ appearing in the distortion-free dot image GD2 to be printed or line interval D of the dot lines in the distortion-free dot image GD2, can be easily recognized by measuring the printed distortion-free dot image GD2 with a known screen gauge.

(A-4) Lateral Enlargement Processing

Figure 9:
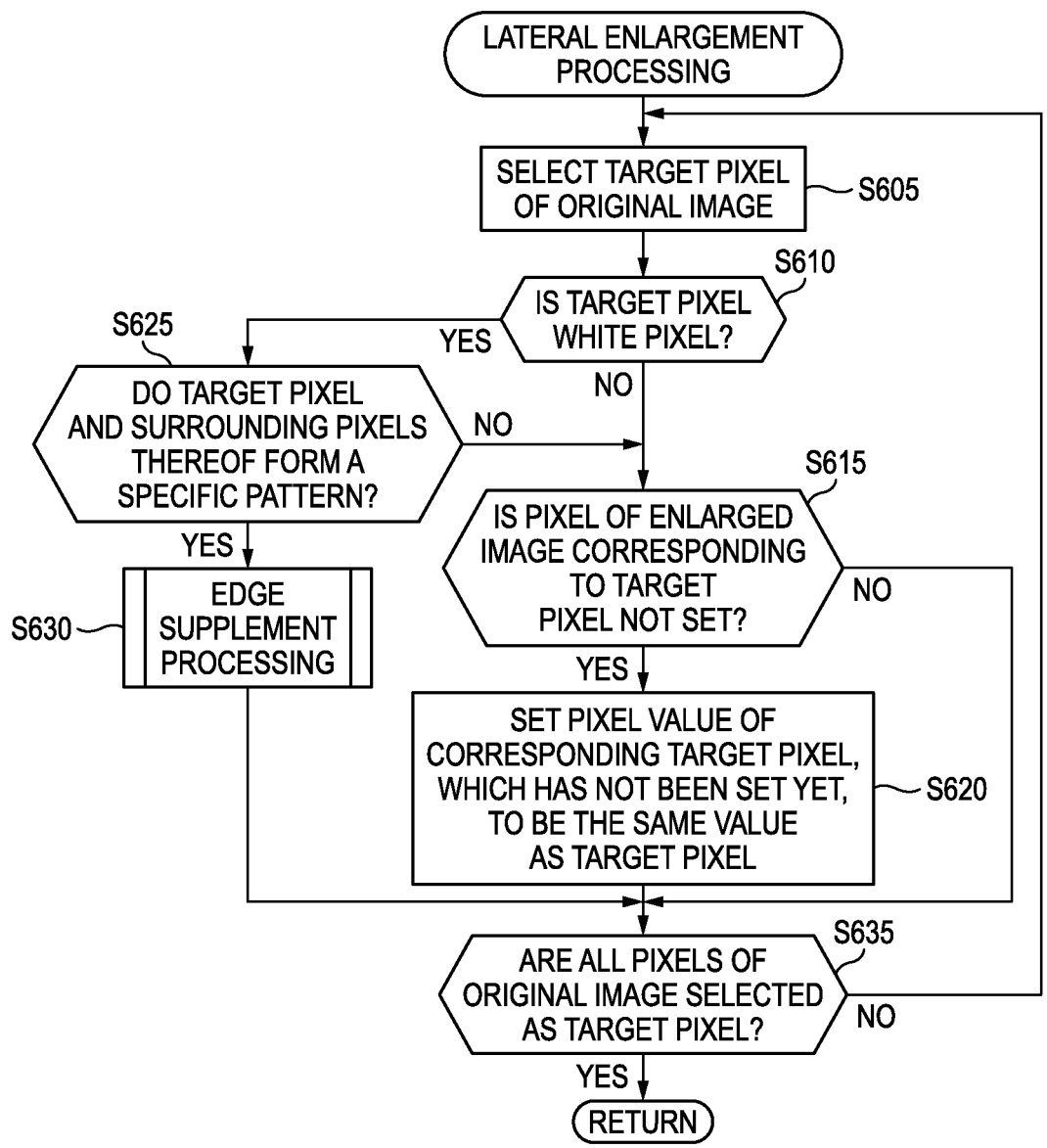
FIG. 9 is a flowchart of lateral enlargement processing.

FIG. 9 is a flowchart of the lateral enlargement processing (FIG. 2: S600). As described above, the lateral enlargement processing is executed for the distortion-free image data expressing the distortion-free image PG1. As a result of the lateral enlargement processing, the distorted image data, which expresses the distorted image PG2 obtained by enlarging twice a lateral size of the distortion-free image PG1 (enlarging twice the number of lateral pixels), is generated. In the descriptions of the lateral enlargement processing, the distortion-free image PG1 is also referred to as an original image, and the distortion-free image data is also referred to as original image data. Further, the distorted image PG2 is also referred to as an enlarged image, and the distorted image data is also referred to as enlarged image data. The lateral enlargement processing includes processing of simply enlarging twice a lateral size of the original image and processing (edge supplement processing) of adding a supplement pixel to the enlarged image so as to improve an appearance of an edge of the enlarged image.

In step S605, the target pixel selection unit M141 of the enlargement processing unit M14 sequentially selects, as a processing target, the target pixel SP one by one from the pixels configuring the original image (distortion-free image PG1). Specifically, in this processing, the processing target is sequentially selected from the upper line (pixel line in the left-right direction) of the distortion-free image PG1 shown in FIG. 3(A) toward the lower line. In the same line, the processing target is sequentially selected from the left pixel toward the right pixel.

In step S610, the enlargement processing unit M14 determines whether the target pixel SP is a white pixel or not by using the pixel value (pixel data) of the target pixel SP. As described above, the pixel value (monochromatic pixel data) of the pixel configuring the distortion-free image PG1 indicates an achromatic color that has a higher density (is closer to black) as the gradation value is larger. Here, the white pixel is a pixel having a pixel value that is zero (0) or relatively close to zero (0), specifically, is a pixel having a pixel value that is a standard value (for example, 5) or smaller for white pixel determination. That is, the white pixel is a pixel having a pixel value of one of 0 to 5. On the other hand, a black pixel that will be described later is a pixel having a pixel value that is 255 or relatively close to 255, specifically, is a pixel having a pixel value that is a standard value (for example, 250) or larger for black pixel determination. That is, the black pixel is a pixel having a pixel value of one of 250 to 255. Incidentally, the pixels (for example, pixels having a pixel value of 6 to 249) except for the black and white pixels are referred to as gray pixels.

When it is determined that the target pixel SP is not the white pixel (step S610: NO), the enlargement processing unit M14 determines whether pixels (corresponding target pixels) TP in the enlarged image corresponding to the target pixel SP are not set or not. When the coordinates of the target pixel SP in the original image are (Xa, Ya), the coordinates of the corresponding target pixels TP in the enlarged image are (2Xa, Ya) and (2Xa+1, Ya). Incidentally, regarding the coordinates of the original image (distortion-free image PG1 (refer to FIG. 3(A)) and the coordinates of the enlarged image (distorted image PG2 (refer to FIG. 3(B)), a coordinate system (a unit thereof is a pixel) is used in which a left-upper of an image is the origin (0, 0), the right direction is a positive direction of the X axis, and the lower direction is a positive direction of the Y axis.

When it is determined that the corresponding target pixels TP are set (step S615: NO), the enlargement processing unit M14 proceeds to processing of step S635. When it is determined that the corresponding target pixels TP are not set (step S615: YES), the enlargement processing unit M14 sets the pixel values of the two corresponding target pixel TP, which are not set yet, to be the same as the pixel value of the target pixel SP (generates the pixel data of the corresponding target pixel TP).

When it is determined in step S610 that the target pixel SP is a white pixel (step S610: YES), the pattern detection unit M142 of the enlargement processing unit M14 determines whether the target pixel SP and the surrounding pixels thereof form any one of specific patterns 1 to 4 (which will be described later) in the original image (step S625).

Figure 10:
FIG. 10 illustrates specific patterns and patterns for count in the lateral enlargement processing of the exemplary embodiment.

FIG. 10 illustrates specific patterns and patterns for count in the lateral enlargement processing of this exemplary embodiment. As shown in FIG. 10, the specific patterns 1 to 4 of four types are configured by 9 pixels (=3 pixels long×3 pixels wide), respectively.

The specific pattern 1 includes a central partial pattern MP1 configured by three pixels that are arranged in a lateral direction, an upper partial pattern UP1 that is adjacent to the central partial pattern MP1 in an upper direction and a lower partial pattern BP1 that is adjacent to the central partial pattern MP1 in a lower direction.

The central partial pattern MP1 includes a central pixel that is a white pixel, a right adjacency pixel that is a white pixel adjacent to the central pixel in a right direction and a left adjacency pixel that is a black pixel adjacent to the central pixel in a left direction. Likewise the central partial pattern MP1, the upper partial pattern UP1 includes a central pixel that is a white pixel, a right adjacency pixel that is a white pixel adjacent to the central pixel in the right direction and a left adjacency pixel that is a black pixel adjacent to the central pixel in the left direction. The lower partial pattern BP1 includes a central pixel that is a black pixel and a right adjacency pixel that is a white pixel adjacent to the central pixel in the right direction. Incidentally, in the lower partial pattern BP1, a pixel (FIG. 10: a pixel having a letter 'any' described therein) that is adjacent to the central pixel in the left direction may be an arbitrary pixel (white pixel, black pixel or gray pixel).

In the central partial pattern MP1, the central pixel (white pixel having an X mark attached thereto in FIG. 10) is also referred to as a center pixel of the specific pattern 1. The pattern detection unit M142 determines whether the target pixel SP and the surrounding pixels thereof correspond to a specific pattern while regarding the target pixel SP as a center pixel. Incidentally, in FIG. 10, the cross-hatched pixels indicate black pixels, and the pixels that are not hatched and pixels (center pixels) having an X mark attached thereto indicate white pixels.

The specific patterns 2, 3, 4 respectively include central partial patterns MP2, MP3, MP4 including center pixels, upper partial patterns UP2, UP3, UP4 that are adjacent to the central partial patterns MP2, MP3, MP4 in the upper direction and lower partial patterns BP2, BP3, BP4 that are adjacent to the central partial patterns MP2, MP3, MP4 in the lower direction. As shown in FIG. 10, the specific pattern 2 is a pattern that is obtained by reversing the specific pattern 1 up and down, the specific pattern 3 is a pattern that is obtained by reversing the specific pattern 1 right and left, and the specific pattern 4 is a pattern that is obtained by reversing the specific pattern 3 up and down.

When the target pixel SP and the surrounding pixels thereof do not form any one of specific patterns 1 to 4 (step S625: NO), the pixel data setting unit M145 of the enlargement processing unit M14 executes the processing of steps S615, S620. That is, when the corresponding target pixels TP corresponding to the target pixel SP are not set, the pixel data setting unit M145 sets the pixel values of the corresponding target pixels TP to be the same as that of the target pixel SP and proceeds to processing of step S635.

When the target pixel SP and the surrounding pixels thereof form any one of specific patterns 1 to 4 (step S625: YES), the enlargement processing unit M14 executes edge supplement processing (step S630).

Figure 11:
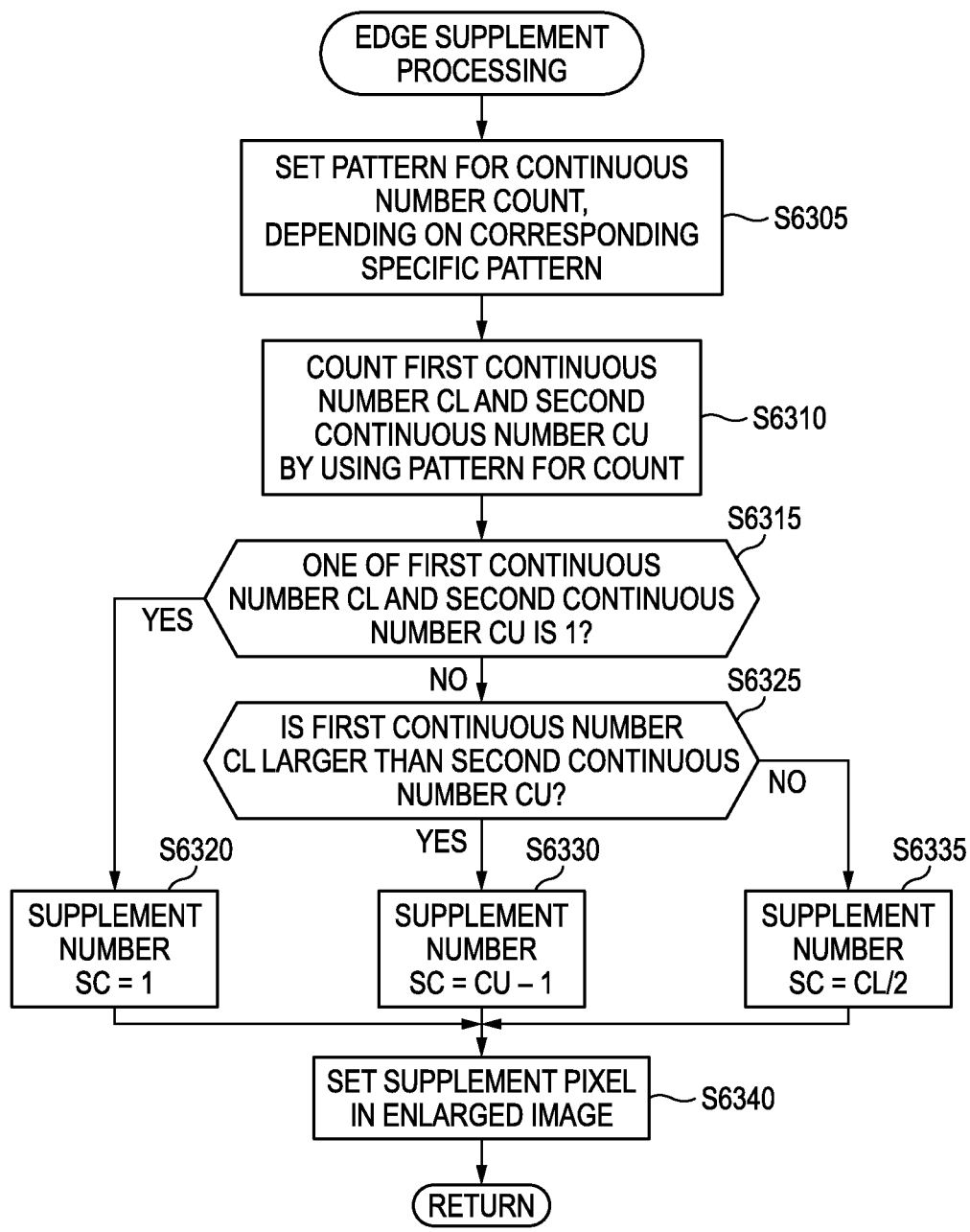
FIG. 11 is a flowchart of edge supplement processing.

FIG. 11 is a flowchart of the edge supplement processing. In step S6305, the continuous number determination unit M143 sets a pattern for count for counting a continuous number, depending on the specific pattern formed by the target pixel SP and the surrounding pixels thereof. In FIG. 10, the patterns for count corresponding to the specific patterns 1 to 4 are shown. The patterns for count include a first pattern LCP for counting a first continuous number CL and a second pattern UCP for counting a second continuous number CU.

The first pattern LCP is a pattern that is the same as a partial pattern among the three partial patterns included in the corresponding specific pattern, which partial pattern is adjacent to the center pixel in a count direction CD1 (refer to FIG. 10: which will be described later) of the first continuous number CL. The second pattern UCP is a pattern that is the same as a partial pattern among the three partial patterns included in the corresponding specific pattern, which partial pattern is adjacent to the center pixel in a count direction CD2 (refer to FIG. 10: which will be described later) of the second continuous number CU. For example, as shown in FIG. 10, the first pattern LCP1 corresponding to the specific pattern 1 is the same as the upper partial pattern UP1 of the specific pattern 1, and the second pattern UCP1 corresponding to the specific pattern 1 is the same as the lower partial pattern BP1 of the specific pattern 1. The first pattern LCP2 corresponding to the specific pattern 2 is the same as the lower partial pattern BP2 of the specific pattern 2, and the second pattern UCP2 corresponding to the specific pattern 2 is the same as the upper partial pattern UP2 of the specific pattern 2.

More specifically, the first pattern LCP1 corresponding to the specific pattern 1 includes a central pixel (white pixel) that is positioned in a longitudinal pixel column at which the center pixel of the specific pattern 1 is located, a right adjacency pixel (white pixel) that is adjacent to the central pixel in the right direction, and a left adjacency pixel (black pixel) that is adjacent to the central pixel in the left direction. That is, the left and right positions of the central pixel (white pixel) of the first pattern LCP1 are the same as those of the center pixel of the specific pattern 1. The second pattern UCP1 corresponding to the specific pattern 1 includes a central pixel (black pixel) that is positioned in a longitudinal pixel column at which the center pixel of the specific pattern 1 is located, and a right adjacency pixel (white pixel) that is adjacent to the central pixel in the right direction. That is, the left and right positions of the central pixel (black pixel) of the second pattern UCP1 are the same as those of the center pixel of the specific pattern 1. Incidentally, in the second pattern UCP1, a pixel (FIG. 10: a pixel having a letter 'any' described therein) that is adjacent to the central pixel in the left direction may be an arbitrary pixel (white pixel, black pixel or gray pixel). Here, in this example, the number of pixels (three pixels) in the first pattern LCP1 and the number of pixels (three pixels) in the second pattern UCP1 are the same. However, they may be different. For example, the second pattern UCP1 may consist of two pixels while a pixel having a letter 'any' described therein is excluded.

In step S6310, the continuous number determination unit M143 counts the first continuous number CL and the second continuous number CU by using the patterns for count (the first pattern LCP and the second pattern UCP). The first continuous number CL is a number that the first pattern LCP continues from the target pixel SP toward the count direction CD1. The second continuous number CU is a number that the second pattern UCP continues from the target pixel SP toward the count direction CD2. A combination of the count direction CD1 and the count direction CD2 is set for each of the specific patterns of four types. The count direction CD1 and the count direction CD2 are opposite to each other. As shown in FIG. 10, for the specific pattern 1, the count direction CD1 is an upward direction and the count direction CD2 is a downward direction. For the specific pattern 2, the count direction CD1 is a downward direction and the count direction CD2 is an upward direction.

FIG. 12 illustrates the edge supplement processing. As shown in FIG. 12(A), a case is exemplified in which an area AR of 3 pixels long×3 pixels wide with the target pixel SP being centered forms the specific pattern 2. In this case, the first continuous number CL is 3 (three) and the second continuous number CU is 4 (four).

In step S6315, the continuous number determination unit M143 determines whether at least one of the first continuous number CL and the second continuous number CU is 1 or not. When at least one of the first continuous number CL and the second continuous number CU is 1 (step S6315: YES), the continuous number determination unit M143 determines 1 as a supplement number SC. When both the first continuous number CL and the second continuous number CU are not 1 (step S6315: NO), the continuous number determination unit M143 determines whether the first continuous number CL is larger than the second continuous number CU (step S6325).

When it is determined that the first continuous number CL is larger than the second continuous number CU (step S6325: YES), the continuous number determination unit M143 determines "CU (the second continuous number)−1" as the supplement number SC (step S6330). When it is determined that the first continuous number CL is the second continuous number CU or smaller (step S6325: NO), the continuous number determination unit M143 determines "CL (the first continuous number)/2" as the supplement number SC (at this time, when the first continuous number is indivisible by 2, a rounding integer value is used) (step S6335).

In the example of FIG. 12(A), the first continuous number CL is smaller than the second continuous number CU. In this case, the first continuous number CL/2=3/2=1.5. Hence, 1.5 is rounded off, so that the supplement number SC (=2) is determined.

When the supplement number SC is determined, the enlargement processing unit M14 sets pixel values of the pixels including the supplement pixel (step S6340). Specifically, the pixel group selection unit M144 of the enlargement processing unit M14 selects a pixel group SCP of a setting target in the enlarged image. In FIG. 12(B), an example of the pixel group SCP is shown. The pixel group SCP includes one set of the corresponding target pixels TP (coordinates thereof are (2Xa, Ya), (2Xa+1, Ya)) corresponding to the target pixel SP (coordinates thereof are (Xa, Ya)). Further, when the supplement number SC is 2 or larger, the pixel group SCP includes: (SC-1) pixels that continue from one corresponding target pixel TP (coordinates thereof are (2Xa, Ya)) in a supplement direction SD; and (SC-1) pixels that continue from the other corresponding target pixel TP (coordinates thereof are (2Xa+1, Ya)) in the supplement direction SD. That is, the pixel group SCP includes 2×SC pixels, which means that two pixel sets arranged in the lateral direction are SC. As shown in FIG. 10, the supplement direction SD is set for each of the four specific patterns. The supplement direction SD is the same as the count direction CD1 of the first continuous number CL and is an opposite direction to the count direction CD2 of the second continuous number CU. In the example of FIG. 12(B), the supplement number SD is 2 (two) and the pixel group includes four pixels including the set of pixels having coordinates (2Xa, Ya) and (2Xa+1, Ya) and the set of pixels having coordinates (2Xa, Ya−1) and (2Xa+1, Ya−1).

The pixel data setting unit M145 sets the respective sets of two pixels that are included in the selected pixel group SCP and are arranged in the lateral direction, with a supplement pattern SDP, respectively. The supplement pattern SDP is set for each of the four specific patterns (FIG. 10: SDP1 to SDP4). As a result, in the enlarged image shown in FIG. 12(B), a pixel group of the pixels included in the pixel group SCP, to which the black pixels are adjacent in the lateral direction, is set as the black pixel, and a pixel group included in the pixel group SCP, to which the white pixels are adjacent in the lateral direction, is set as the white pixel. The pixel group, to which the black pixel is adjacent in the lateral direction, is a pixel group of the pixel column of the pixel group SCP having an X coordinate of 2Xa, for the specific patterns 1, 2. Further, for the specific patterns 3, 4, the pixel group, to which the black pixel is adjacent in the lateral direction, is a pixel group of the pixel column of the pixel group SCP having an X coordinate of (2Xa+1). Here, the pixel that is set as the black pixel may have a pixel value that is set to be 255 or the same value as the pixel value of the black pixel (for example, black pixel adjacent in the right or left direction) adjacent to the target pixel SP of the original pixel. Further, the pixel that is set as the white pixel may have a pixel value that is set to be 0 or the same value as the pixel value of the target pixel SP of the original pixel.

Returning to FIG. 9, in step S635, the enlargement processing unit M14 determines whether all pixels in the original image are selected as the target pixel SP. When it is determined that there is a pixel that has not been selected yet (step S635: NO), the enlargement processing unit M14 returns to step S605, selects the not-selected pixel as a new target pixel SP and repeats the processing of steps S610 to S630. When it is determined that all pixels are selected (step S635: YES), the enlargement processing unit M14 ends the lateral enlargement processing.

The enlarged image (distorted image PG2 (FIG. 3(B)) that is generated by the lateral enlargement processing is an image having the supplement pixels to a simple enlarged image. Here, the simple enlarged image is an image in which the same pixel column as the mth pixel column is arranged between the mth pixel column along the longitudinal direction configuring the original image and the (m+1)th pixel column. That is, in the simple enlarged image, the oddth pixel column and the eventh pixel column after the oddth pixel column are the same. The pixel group configuring the supplement pixels (pixels that are set as the black pixels in step S6340 (FIG. 11)) includes a pixel (corresponding specific pixel) of the enlarged image corresponding to a specific pixel (white pixel positioned at the center of the specific pattern) of the nine pixels configuring the specific patterns 1 to 4 in the original image and has pixels of the supplement number SC extending in the longitudinal direction.

In the example of the enlarged image shown in FIG. 12(B), the cross-hatched pixels indicate the black pixels configuring the simple enlarged image, and the single-hatched pixels indicate the black pixels that are the supplement pixels. This is the same as an example of the enlarged image shown in FIG. 13.

In FIG. 12(C), the printed image (distortion-free dot image GD2) corresponding to the enlarged image (distorted image PG2) shown in FIG. 12(B) is shown. In FIG. 12(C), the cross-hatched pixels indicate dot forming pixels (pixels having a pixel value of '1') corresponding to the black pixels configuring the simple enlarged image in the enlarged image. Further, the single-hatched pixels indicate dot forming pixels corresponding to the supplement pixels in the enlarged image. As described above with reference to FIG. 2, the printed image is an image that is obtained by enlarging twice the distorted image PG2 in the longitudinal direction. Therefore, in the printed image, the number of the dot forming pixels SCD corresponding to the supplement pixels is twice as many as the number of the supplement pixels in the enlarged image (FIG. 12(B)).

According to the above-described exemplary embodiment, the pixel group selection unit M144 selects the pixel group SCP of the enlarged image, which includes the corresponding specific pixel corresponding to the specific pixel (in this exemplary embodiment, the pixel positioned at the center of the nine pixels forming each specific pattern) that is the white pixel configuring any one of the specific patterns 1 to 4 (FIG. 10) in the original image (FIG. 12). The pixel data setting unit M145 sets the pixel group of one column of the pixel group SCP having the two columns as the black pixels, e.g., arranges the supplement pixels in the area corresponding to the pixel group SCP. The number (the supplement number SC) of pixels that are set as the black pixels is the number corresponding to the first continuous number CL and the second continuous number CU. As a result, it is possible to improve the appearance of the edge of the enlarged image corresponding to the specific pattern, considering the arrangement of the pixels in the upper and lower directions from a standpoint of the specific pixel of the specific pattern in the original image.

More specifically, for example, the specific pattern 1 is a pattern including the upper partial pattern UP1, the central partial pattern MP1 and the lower partial pattern BP1, as shown in FIG. 10. That is, the specific pattern 1 is a pattern in which a shape made by the black pixels is an L shape (a shape having a step of one pixel in the lateral direction). The other specific patterns 2 to 4 are also the same.

Figure 13:
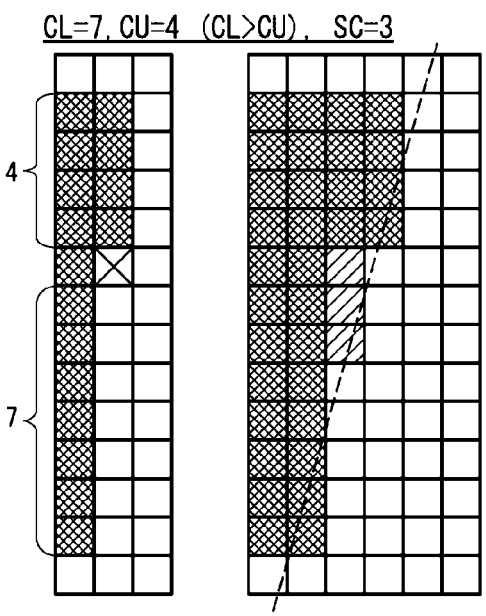
FIGS. 13(A)-13(F) show arrangement examples of supplement pixels in an enlarged image.
Figure 13:
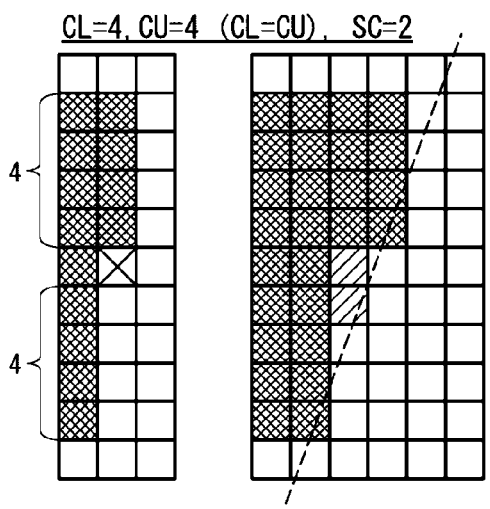
Figure 13:
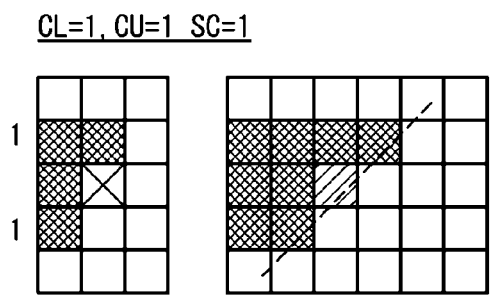
Figure 13:
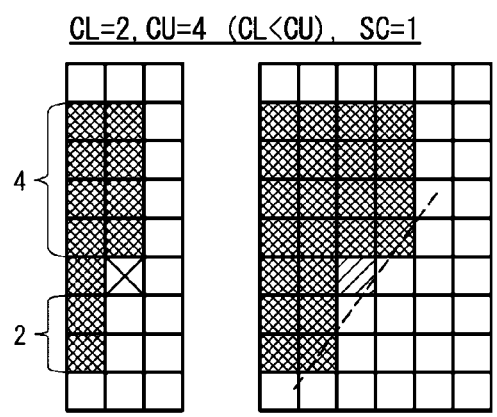
Figure 13:
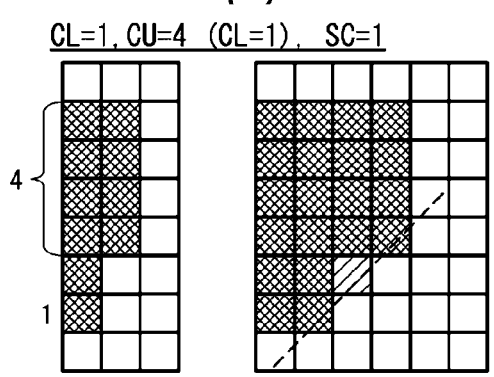
Figure 13:
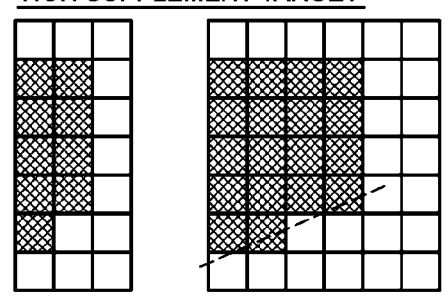
Figure 14:
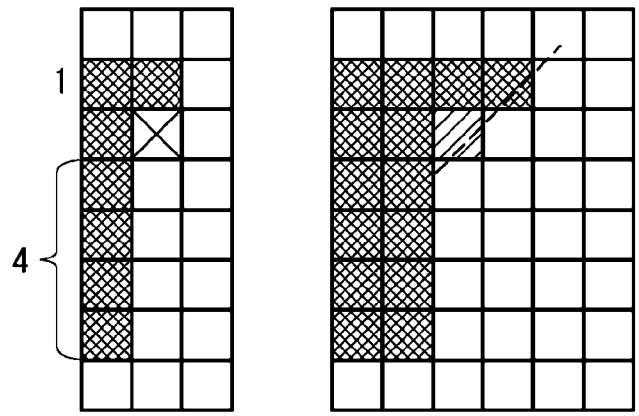
FIGS. 14(A)-14(B) show arrangement examples of supplement pixels in an enlarged image.
Figure 14:
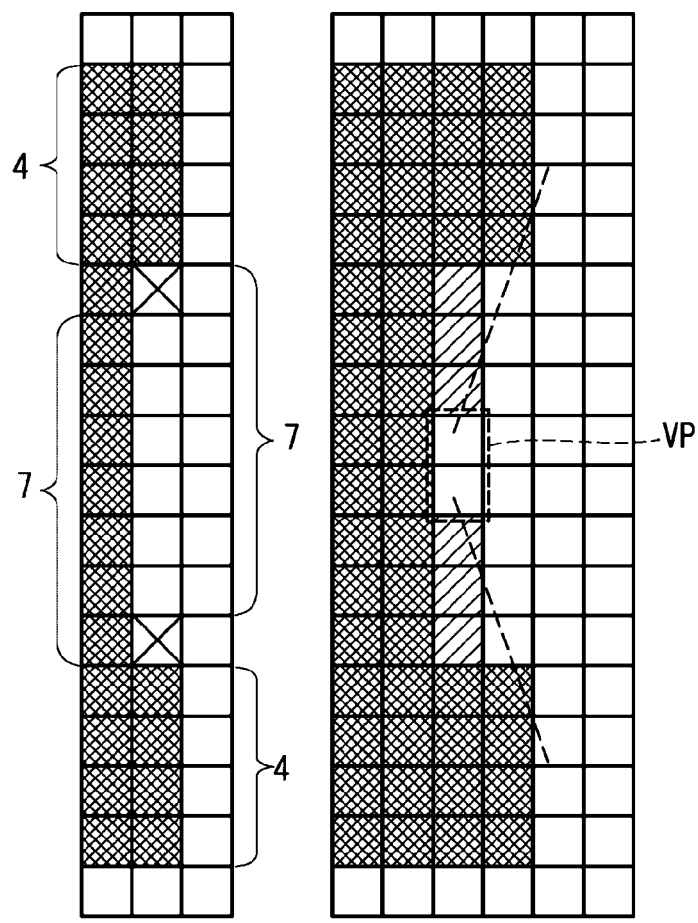

FIGS. 13 and 14 show arrangement examples of the supplement pixels in the enlarged image. In respective FIGS. 13(A) to 13(F) and FIGS. 14(A) and 14(B), the left view shows a part of an original image and the right view shows a part of an enlarged image corresponding to the part of the original image. Further, the broken line in the enlarged image of FIGS. 13 and 14 schematically indicates a direction of an edge formed by white and black pixels.

As can be seen from FIGS. 13 and 14, a step of one pixel in the lateral direction in the original image becomes a step of two pixels in the lateral direction in the simple enlarged image. Therefore, a backlash of an edge in an oblique direction is increased in the simple enlarged image, compared to the original image. As a result, the backlash of the edge in the oblique direction is also apt to be conspicuous in the distortion-free dot image GD2 that is finally printed using the simple enlarged image.

In this exemplary embodiment, as described above, the L-shaped specific pattern is detected and is set as the arrangement target of the supplement pixels. Thus, it is possible to appropriately select an edge having an appearance that is to be improved and to improve the appearance. For example, while the supplement pixel is arranged in the examples of FIGS. 13(A) to 13(E), the supplement pixel is not arranged in the example of FIG. 13(F). As a result, it is possible to suppress that the supplement pixel is arranged at a place at which if the supplement pixel is arranged, an overall shape of the edge (for example, refer to the broken line of FIG. 13(F)) may be deteriorated. Incidentally, FIGS. 13(A) to 13(E) and FIG. 14(B) show the examples of the supplement target place corresponding to the specific pattern 2, and FIG. 14(B) shows an example in which the supplement target place (upper side) corresponding to the specific pattern 2 and the supplement target place (lower side) corresponding to the specific pattern 1 are close to each other.

Further, the continuous number determination unit M143 counts the first continuous number CL by using the first patterns LCP1 to LCP4 that are the same patterns as the partial patterns UP1, BP2, UP3, BP4 of the specific patterns 1 to 4. The continuous number determination unit M143 counts the second continuous number CU by using the second patterns UCP1 to UCP4 that are the same patterns as the partial patterns BP1, UP2, BP3, UP4 of the specific patterns 1 to 4. As a result, it is possible to appropriately count the first continuous number CL and the second continuous number CU for determining the supplement number SC.

Further, when the first continuous number CL is larger than the second continuous number CU, the continuous number determination unit M143 determines the supplement number SC by using the second continuous number CU (specifically, SC=CU−1. FIG. 11: S6330).

For example, FIG. 13(A) shows the example in which the first continuous number CL is 7 (seven), the second continuous number CU is 4 (four) and there is one supplement target place. FIG. 14(B) shows the example in which the first continuous number CL is 7 (seven), the second continuous number CU is 4 (four) and there are two supplement target places. In these examples, the supplement number SC is set as an appropriate number (3) by using the second continuous number CU, so that the edge is made to be smooth while keeping the overall shape of the edge extending in the direction shown with the broken line. Further, in the example of FIG. 14(B), the supplement number SC is set as an appropriate number (3, in upper and lower sides, respectively), so that the pixels indicated with a reference numeral VP in FIG. 14 are not set with the black pixels. That is, the upper supplement pixels and the lower supplement pixels are suppressed from being connected to each other. As a result, the step that should be expressed is not lost by the supplement pixels and the edge can be made to be smooth.

Further, when the first continuous number CL is the second continuous number CU or smaller, the continuous number determination unit M143 determines the supplement number SC by using the first continuous number CL (specifically, SC=CL/2. FIG. 11: S6335).

For example, FIG. 13(B) shows the example of the supplement target place in which the first continuous number CL is 4 (four) and the second continuous number CU is 4 (four), and FIG. 13(D) shows the example of the supplement target place in which the first continuous number CL is 2 (two) and the second continuous number CU is 4 (four). In these examples, the supplement number SC is set as an appropriate number (two in FIG. 13(B) and one in FIG. 13(D)) by using the first continuous number CL, so that the edge is made to be smooth while keeping the overall shape of the edge extending in the direction shown with the broken line.

Further, when at least one of the first continuous number CL and the second continuous number CU is 1 (one), the continuous number determination unit M143 determines 1 as the supplement number SC (FIG. 11: S6320).

For example, FIG. 13(C) shows the example of the supplement target place in which the first continuous number CL is 1 (one) and the second continuous number CU is 1 (one), FIG. 13(E) shows the example of the supplement target place in which the first continuous number CL is 1 (one) and the second continuous number CU is 4 (four), and FIG. 14(A) shows the example of the supplement target place in which the first continuous number CL is 4 (four) and the second continuous number CU is 1 (one). In the examples, the supplement number SC is set as an appropriate number (one), so that the edge is made to be smooth while keeping the overall shape of the edge extending in a direction shown with the broken line.

Like this, the supplement number SC is determined by appropriately using the first continuous number CL and the second continuous number CU. As a result, it is possible to suppress the backlash of the edge while keeping the overall shape of the edge that should be reproduced. Hence, it is possible to suppress the backlash of the edge while keeping the overall shape of the edge of the original image in the final printed image (distortion-free dot image GD2).

Figure 15:
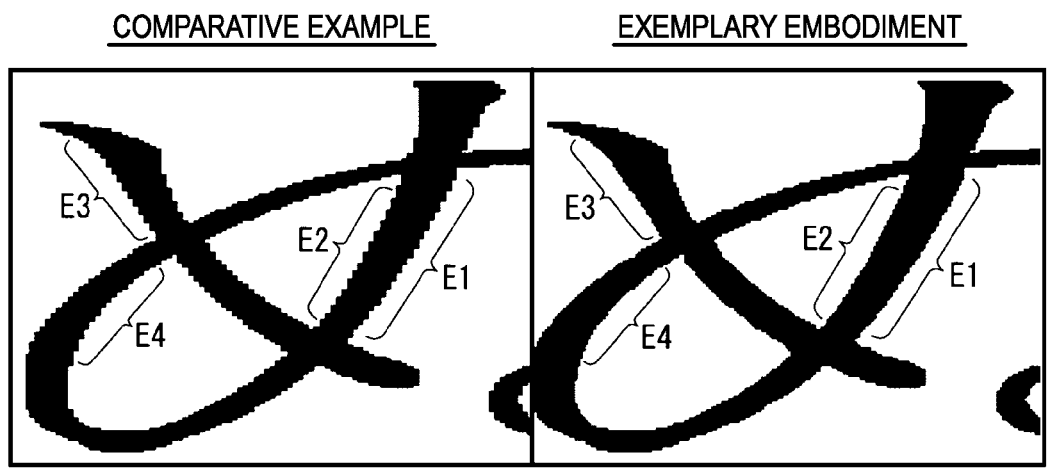
FIGS. 15(A)-15(B) show edges of printed images of the exemplary embodiment and edges printed images of a comparative example.
Figure 15:
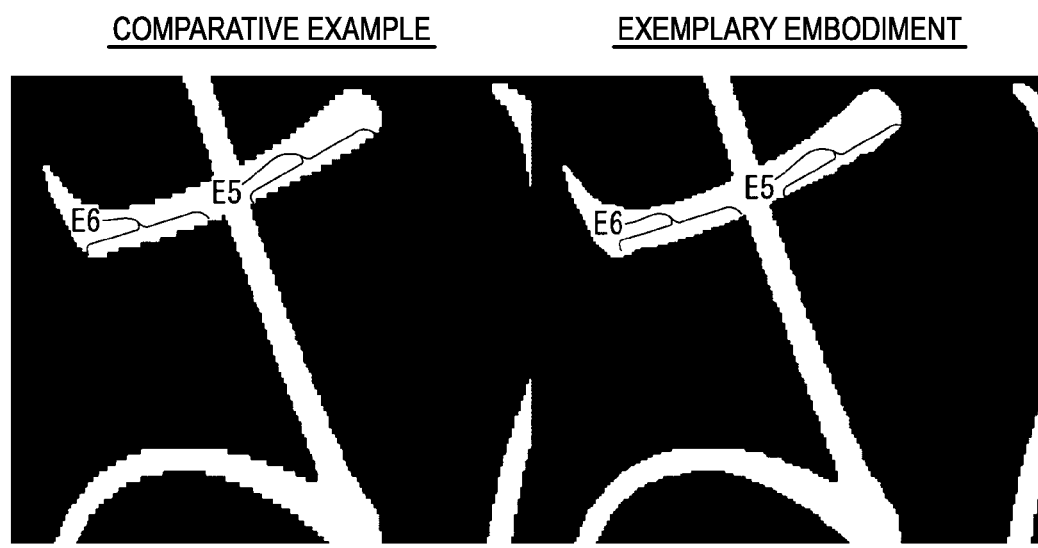

FIG. 15 shows an edge of a printed image of this exemplary embodiment and an edge of a printed image of a comparative example. FIG. 15(A) shows an example where the target image data acquired in step S100 (FIG. 2) is a portrait. FIG. 15(B) shows an example where the target image data acquired in step S100 (FIG. 2) is a landscape. In FIGS. 15(A) and 15(B), the right views show a case where the image processing of this exemplary embodiment has been performed, e.g., the supplement pixels have been added and the left views show a case where the simple enlarge image has been used, e.g., the supplement pixels have not been added.

It can be seen from FIGS. 15(A) and 15(B) that the backlash of the edge is suppressed in the right printed images of this exemplary embodiment even though the overall shape of the edge formed by the white and black pixels is not changed, compared to the left printed image formed using the simple enlarged image. In the printed image of this exemplary embodiment, the backlash of the edge is remarkably suppressed at the edge extending in the oblique direction (for example, parts indicated by the reference numerals E1 to E6).

Further, the enlargement processing unit M14 of this exemplary embodiment sequentially selects the target pixel SP from the plurality of pixels configuring the original image (FIG. 9: S605, S635) and executes one of first processing (FIG. 9: step S630) including the edge supplement processing and second processing (for example, FIG. 9: steps S615, S620) not including the edge supplement processing whenever the target pixel SP is selected, thereby generating the enlarged image data. The first processing is executed when the target pixel SP includes the specific pixel (center pixel of the pixel group forming the specific pattern). The second processing is executed when the target pixel SP do not include the specific pixel. As a result, it is possible to easily prepare the enlarged image (distortion-free image PG1) having the supplement pixels added thereto.

Further, according to this exemplary embodiment, the halftone processing unit M16 uses the dither matrix to generate the distorted dot data expressing the distorted dot image GD1 having the pixel-number ratio S2 that is twice as large as the pixel-number ratio S of the distortion-free image PG1 (FIG. 2: S700). Then, the dot image enlargement unit M18 executes the dot image enlarging processing for the distorted dot data and generates the distortion-free dot data expressing the distortion-free dot image GD2 (FIG. 2: S800). As a result, since the halftone processing unit M16 just has only to generate the distorted dot data, which expresses the distorted dot image GD1 smaller than the distortion-free dot image GD2, it is possible to reduce the throughput of the halftone processing.

Further, according to the above-described exemplary embodiment, since the compression unit M19 compresses the distortion-free dot data, which expresses the distortion-free dot image GD2 including the set of the same lines, by using the pre-reference compression processing (refer to FIG. 4), it is possible to reduce the data amount of the distortion-free dot data. Hence, it is possible to reduce the data amount of the print data that is transmitted to the printing apparatus 200. As a result, it is possible to reduce a memory capacity (for example, a capacity of the volatile memory 214) that is required for the printing apparatus 200.

Further, the screen angle appearing in the printed image, e.g., the screen angle appearing in the distortion-free dot image GD2 (partial distortion-free dot image PGD2 (refer to FIG. 8)) in this exemplary embodiment affects the image quality. For example, regarding the human visual features, it has been known that the resolution is high for longitudinal and lateral stripe patterns and is low for an oblique stripe pattern is known. Thus, the longitudinal and lateral stripe patterns are apt to be conspicuous and the oblique stripe pattern is not conspicuous well. Taking into consideration the human visual features, the screen angle appearing in the printed image is generally set to be 45° in the monochrome printing. According to the above configuration, the screen angle $\phi$ of the dither matrix DM1 is set to be $\phi=\arctan((\tan\theta)/2)$, so that the screen angle appearing in the distortion-free dot image GD2 (partial distortion-free dot image PGD2 (FIG. 8)) becomes the target value $\theta$. Specifically, the screen angle $\phi$ of the dither matrix DM1 is set to be about 26.56°, so that the screen angle appearing in the distortion-free dot image GD2 (partial distortion-free dot image PGD2 (FIG. 8)) becomes about 45°. As a result, it is possible to improve the image quality of the printed image by adjusting the screen angle appearing in the printed image, e.g., the distortion-free dot image GD2.

The lines per inch (1 pi) in the printed image, e.g., in this exemplary embodiment, the lines per inch in the distortion-free dot image GD2 (partial distortion-free dot image PGD2 (FIG. 8)) affects the image quality. For example, when the lines per inch are small, a size (corresponding to the sub-matrix CE1 (FIG. 6)) of the set of the dots adjacent to each other is increased, so that the stability of toner is improved and a defect such as banding is difficult to occur. However, when the lines per inch are small, an image becomes rough and the backlash of the edge is increased. Thus, considering the merits and weak points, the proper lines per inch are determined. The lines per inch in the distortion-free dot image GD2 (partial distortion-free dot image PGD2 (FIG. 8)) are determined by the line interval D. According to the above configuration, in the dither matrix DM1, the line interval L appearing in the distorted dot image GD1 (partial distorted dot image PGD1 (FIG. 7)) is set to be about $(½)\times D\times\cos\phi/\cos\theta$ ($\phi=\arctan((\tan\theta)/2)$), so that the line interval appearing in the distortion-free dot image GD2 (partial distortion-free dot image PGD2 (FIG. 8)) becomes the target value D. As a result, it is possible to improve the image quality of the printed image by adjusting the line interval D appearing in the distortion-free dot image GD2 and the lines per inch determined by the line interval D.

As can be seen from the above descriptions, in this exemplary embodiment, any one of the upward and downward directions is an example of the first direction, and any one of the right and left directions is an example of the second direction intersecting with the first direction. Further, in this exemplary embodiment, the upper partial patterns UP1, UP3 of the specific patterns 1, 3 are examples of the first partial pattern, and the lower partial patterns BP1, BP3 of the specific patterns 1, 3 are examples of the second partial pattern. Further, in this exemplary embodiment, the lower partial patterns BP2, BP4 of the specific patterns 2, 4 are examples of the first partial pattern, and the upper partial patterns UP2, UP4 of the specific patterns 2, 4 are examples of the second partial pattern.

Modifications to Exemplary Embodiments

Modifications to the exemplary embodiments will now be described.

(B-1) In the above-described exemplary embodiment, the enlargement processing unit M14 executes the lateral enlargement processing (FIG. 2: step S600) of enlarging the original image in the lateral direction, as the processing of enlarging the original image (distortion-free image PG1) to generate the enlarged image (distorted image PG2). However, the enlargement processing unit M14 may execute the longitudinal enlargement processing of enlarging the original image in the longitudinal direction. For example, when the target image data acquired in step S100 (FIG. 2) is a landscape, the enlargement processing unit M14 may execute the longitudinal enlargement processing, instead of the lateral enlargement processing, without executing the 90° rotation processing (FIG. 2: S500). In this case, it is preferable to execute the 90° rotation processing for the enlarged image data expressing the enlarged image (distorted image) generated by the longitudinal enlargement processing, before performing the halftone processing (FIG. 2: S700).

Figure 16:
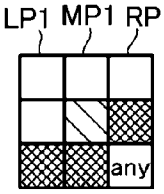
FIG. 16 illustrates specific patterns and patterns for count in a longitudinal enlargement processing.

FIG. 16 illustrates specific patterns and patterns for count in the longitudinal enlargement processing. The longitudinal enlargement processing is basically the same as the lateral enlargement processing (FIGS. 9 and 11) of the above-described exemplary embodiment but is different as regards following points.

1) In the longitudinal enlargement processing, when the coordinates of the target pixel SP of the original image are (Xa, Ya), the coordinates of the corresponding target pixels TP of the enlarged image are (Xa, 2Ya) and (Xa, 2Ya+1).

2) As shown in FIG. 16, the specific patterns 1 to 4 of four types in the longitudinal enlargement processing are patterns that are obtained by rotating the specific patterns 1 to 4 of four types in the lateral enlargement processing by 90° (in the example of FIG. 16, 90° in the counterclockwise direction), respectively.

3) As shown in FIG. 16, the first patterns LCP1 to LCP4, the second patterns UCP1 to UCP4, the count directions CD1, CD2, the supplement direction SD and the supplement patterns SDP1 to SDP4, which correspond to the specific patterns 1 to 4 in the longitudinal enlargement processing, are obtained by rotating the corresponding elements LCP1 to LCP4, UCP1 to UCP4, CD1, CD2, SD and SDP1 to SDP4 in the lateral enlargement processing by 90° (in the example of FIG. 16, 90° in the counterclockwise direction), respectively.

For example, the specific patterns 1 to 4 in the longitudinal enlargement processing respectively includes: central partial patterns MP1 to MP4, each of which is configured by three pixels arranged in the longitudinal direction; left adjacency patterns LP1 to LP4 that are adjacent to the central partial patterns MP1 to MP4 in the left direction; and right adjacency patterns RP1 to RP4 that are adjacent to the central partial patterns MP1 to MP4 in the right direction.

Each of the first patterns LCP1 to LCP4 in the longitudinal enlargement processing is a pattern that is the same as a partial pattern among the three partial patterns included in the corresponding specific pattern, which partial pattern is adjacent to the center pixel in the count direction CD1. Each of the second patterns UCP1 to UCP4 in the longitudinal enlargement processing is a pattern that is the same as a partial pattern among the three partial patterns included in the corresponding specific pattern, which partial pattern is adjacent to the center pixel in the count direction CD2.

Even when the longitudinal enlargement processing is adopted, the same operations/effects as the above-described exemplary embodiment are realized.

Further, as can be seen from the above descriptions, in this modified exemplary embodiment, any one of the right and left directions is an example of the first direction and any one of the downward and upward directions is an example of the second direction intersecting with the first direction. Further, in this modified exemplary embodiment, the left partial patterns LP1, LP3 of the specific patterns 1, 3 are examples of the first partial pattern, and the right partial patterns RP1, RP3 of the specific patterns 1, 3 are examples of the second partial pattern. Further, in this modified exemplary embodiment, the right partial patterns RP2, RP4 of the specific patterns 2, 4 are examples of the first partial pattern, and the left partial patterns LP2, LP4 of the specific patterns 2, 4 are examples of the second partial pattern.

(B-2) Instead of the lateral enlargement processing (FIG. 9) of the above-described exemplary embodiment, the simple enlarged image data expressing the simple enlarged image may be first generated, the simple enlarged image data may be corrected to add the supplement pixels to the simple enlarged image and then the enlarged image data may be generated.

Figure 17:
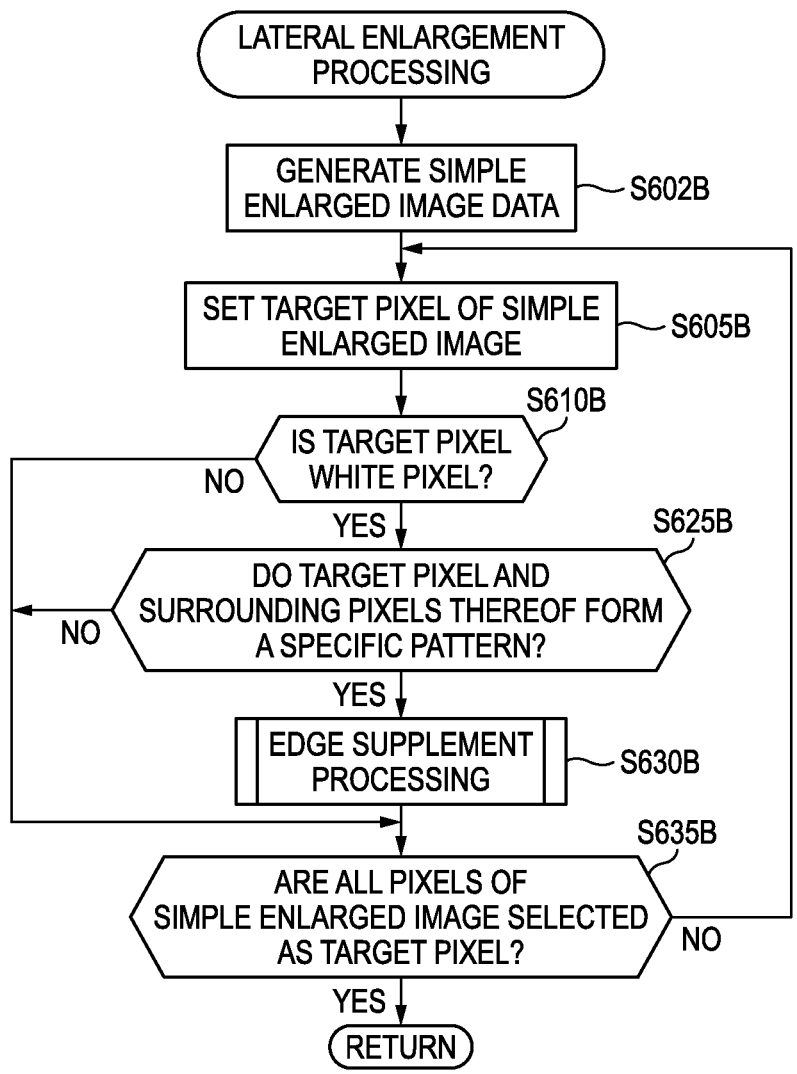
FIG. 17 is a flowchart of the lateral enlargement processing in a modified exemplary embodiment.

FIG. 17 is a flowchart of the lateral enlargement processing in this modified exemplary embodiment. In step S602B, the enlargement processing unit M14 generates the simple enlarged image data. In step S605B, the enlargement processing unit M14 sequentially selects the target pixel, which is the processing target, one by one from the pixels configuring the simple enlarged image. Specifically, the processing target is sequentially selected from the upper line of the simple enlarged image toward the lower line. In the same line, the processing target is sequentially selected from the left pixel toward the right pixel.

In step S610B, the enlargement processing unit M14 determines whether the target pixel SP is a white pixel or not, likewise the step S610 of the above-described exemplary embodiment. When it is determined that the target pixel is a white pixel (step S610B: YES), the pattern detection unit M142 of the enlargement processing unit M14 determines whether the target pixel and the surrounding pixels thereof form any one of specific patterns 1 to 4 (which will be described later) in the simple enlarged image (step S625B).

FIG. 18 illustrates specific patterns and patterns for count in the lateral enlargement processing of this modified exemplary embodiment. The specific patterns of this modified exemplary embodiment are specific patterns 1 to 4 (FIG. 18) of the enlarged image corresponding to the specific patterns 1 to 4 (FIG. 10) of the original image in the above-described exemplary embodiment. The specific patterns 1 to 4 of the enlarged image in this modified exemplary embodiment are also referred to as the corresponding specific patterns. For example, the corresponding specific patterns 1 to 4 are patterns of 3 pixels long×4 pixels wide (12 pixels in total) including four longitudinal columns (FIG. 18). The two central columns (second and third columns) of the corresponding specific patterns 1 to 4 are the same as the central column of the three longitudinal columns configuring the specific patterns 1 to 4 (FIG. 10) of the original image. The pattern detection unit M142 can detect the same positions as the positions on the enlarged image, which are detected as the positions at which the supplement pixels should be added in the above-described exemplary embodiment, in the simple enlarged image by detecting the corresponding specific patterns 1 to 4 of the enlarged image in the simple enlarged image.

When it is determined in step S610B that the target pixel is not a white pixel (step S610B: NO) and when it is determined in step S625B that the target pixel and the surrounding pixels thereof do not form any one of the specific patterns 1 to 4 of four types in the simple enlarged image (step S625B: NO), the enlargement processing unit M14 proceeds to processing of step S635B.

When it is determined that the target pixel and the surrounding pixels thereof form any one of the specific patterns 1 to 4 of four types in the simple enlarged image (step S625B: YES), the enlargement processing unit M14 executes the edge supplement processing (step S630B).

The edge supplement processing of this modified exemplary embodiment is basically the same as the edge supplement processing (FIG. 11) of the above-described exemplary embodiment but is different as regards following points.

1) In this modified exemplary embodiment, the first continuous number CL and the second continuous number CU are counted in the simple enlarged image. In this modified exemplary embodiment, the first patterns LCP1 to LCP4 and second patterns UCP1 to UCP4 that are used for the counting are the same patterns as the four pixels (the upper partial patterns UP1 to UP4 and lower partial patterns BP1 to BP4) arranged in the lateral direction, which are parts of the corresponding specific patterns 1 to 4, as shown in FIG. 18.

Like this, even when the first continuous number CL and the second continuous number CU are counted in the simple enlarged image, and even when the first continuous number CL and the second continuous number CU are counted in the original image, like the above-described exemplary embodiment, the first continuous number CL and the second continuous number CU have the same values, resultingly. As a result, in any case, the continuous number determination unit M143 can appropriately determine the supplement number SC as the number corresponding to the first continuous number CL and the second continuous number CU in the original image.

Incidentally, also in this modified exemplary embodiment, the first continuous number CL and the second continuous number CU may be counted in the original image, like the above-described exemplary embodiment. Meanwhile, when the counting is made in the simple enlarged image, it is possible to reduce the memory capacity that is required for the processing, because the original data may be erased at the time at which the simple enlarged image data is generated.

Even when the lateral enlargement processing of this modified exemplary embodiment is adopted, the same operations/effects as the above-described exemplary embodiment are realized.

(B-3) In the lateral enlargement processing of the above-described exemplary embodiment, when the specific pattern configured by the white and black pixels is included in the original image, the black pixel is added to the enlarged image as the supplement pixel. However, the specific pattern is not limited to the combination of the white and black pixels and may be a combination of a first type pixel and a second type pixel expressing colors having a relatively large color difference (larger than a reference value) therebetween. For example, among the pixels expressing gradation values of color components (for example, any one of RGB or CMY) other than black, a combination of a pixel having a color close to the maximum value and a pixel having a color close to the minimum value may be used. The first type pixel preferably includes a pixel in which a specific gradation value (for example, any one gradation value of RGB, any one of gradation value of CMY) is one of the maximum value and the minimum value of a value that the specific gradation value can take, and the second type pixel preferably includes a pixel in which the specific gradation value is the other of the maximum value and the minimum value of the value that the specific gradation value can take.

(B-4) In the above-described exemplary embodiment, the print data for monochrome printing is generated. Alternatively, the print data for color printing may be generated. For example, the image processing may be performed for RGB data or bitmap data (CMYK image data) configured by CMYK pixel data expressing a set (specifically, a set of gradation values of CMYK) of gradation values of color components corresponding to printing materials (specifically, CMYK toners) that are used for color printing. Specifically, the printer driver M10 may execute the processing (FIG. 2: S600 to S900) including the lateral enlargement processing for each monochromatic image data represented by the pixel value of each color component, so as to generate the compressed dot data 300 of the respective color components of CMYK. The printer driver M10 may generate the print data by using the compressed dot data 300 and transmit the same to the printing apparatus 200.

(B-5) In the above-described exemplary embodiment, the pattern for count (the first pattern LCP, the second pattern UCP) is the same as the partial specific pattern that is a part of the corresponding specific pattern. However, the pattern for count may be different from the partial specific pattern.

(B-6) In the above-described exemplary embodiment, the dot image enlargement unit M18 generates the distortion-free dot data, which is not compressed, and then the compression unit M19 compresses the distortion-free dot data to generate the compressed dot data 300 (FIG. 5). Alternatively, the dot image enlargement unit M18 may generate the compressed dot data 300 by using the distorted dot data, without generating the distortion-free dot data, which is not compressed. Specifically, the dot image enlargement unit M18 may compress the respective line data included in the distorted dot data and add the even line data 310B (ON reference flag data) just after the odd line data, whenever the odd line data 310A, 320, 330 is generated in the distortion-free dot data. The dot image enlargement unit M18 may repeat the corresponding processing for all line data included in the distorted dot data and generate the compressed dot data 300 that is the compressed distortion-free dot data, without generating the distortion-free dot data, which is not compressed. That is, the dot image enlargement unit M18 may generate the distortion-free dot data (compressed dot data 300), which includes the compressed data expressing the set of the same lines, by using the distorted dot data.

(B-7) In the image processing of the above-described exemplary embodiment, the steps S800 and S900 (FIG. 2) may be omitted and the distorted dot data generated in S700 may be supplied to the printing apparatus 200, as the print data. In this case, the apparatus control unit M20 of the printing apparatus 200 may generate the distortion-free dot data by using the distorted dot data and supply the generated distortion-free dot data to the printer engine 250. By doing so, the printing apparatus 200 can print the distortion-free dot image GD2 that is expressed by the distortion-free dot data, like the above-described exemplary embodiment.

(B-8) The respective functional units M12 to M19 of the printer driver M10 in the above-described exemplary embodiment may be implemented by the control circuit 212 of the printing apparatus 200. That is, the image processing may be executed in the control circuit 212 of the printing apparatus 200. In this case, the appearance of the edge in the printed image can be improved by the image processing in the printing apparatus 200.

(B-9) In the above-described exemplary embodiment, a part of the configurations implemented by hardware may be replaced with software. To the contrary, a part or all of the configurations implemented by the software may be replaced with hardware.

Although the invention has been described with reference to the exemplary and modified exemplary embodiments, the embodiments have been provided to easily understand the invention, not to limit the invention. The invention can be changed and modified without departing from the scope and the claims and includes the equivalents.

[FIG. 1]
M10: printer driver
M12: image data acquisition unit
M14: enlargement processing unit
M141: target pixel selection unit
M142: pattern detection unit
M143: continuous number detection unit
M144: pixel group selection unit
M145: pixel data setting unit
M16: halftone processing unit
M18: dot image enlargement unit
M19: compression unit
120: internal storage device
130: external storage device
132: driver program
134: image data
170: operation unit
180: display unit
190: communication unit
212: control circuit
M20: apparatus control unit
250: printer engine
290: communication unit
214: volatile memory
216: non-volatile memory
270: operation unit
280: display unit
[FIG. 2]
Image Processing
S100: Acquire target image data
S200: Rasterizing processing
S300: Monochrome conversion processing
S400: Longitudinally long image?
S500: 90° rotation processing
S600: Lateral enlargement processing
S700: Halftone processing
S800: Dot image enlargement processing
S900: Compression processing
S1000: Generate print data
S1100: Transmit print data
[FIG. 4]
Compression Processing
S902: Select processing target line
S904: Same as previous processing target line?
S906: Generate 'OFF' reference flag data
S908: Generate compressed line data of processing target and data amount data
S910: Generate 'ON' reference flag data
S912: Are all lines selected?
[FIG. 5]
310A: reference flag OFF
320: data amount
330: compressed line data
310B: reference flag ON
320: data amount
330: compressed line data
310B: reference flag ON
first line, second line, third line, fourth line
[FIG. 9]
Lateral Enlargement Processing
S605: Select target pixel of original image
S610: Is target pixel white pixel?
S615: Is pixel of enlarged image corresponding to target pixel not set?
S620: Set pixel value of corresponding target pixel, which has not been set yet, to be the same value as target pixel
S625: Do target pixel and surrounding pixels thereof form a specific pattern?
S630: Edge supplement processing
S635: Are all pixels of original image selected as target pixel?
RETURN
[FIG. 10]
specific pattern
first continuous number CL
second continuous number CU
first pattern LCP
count direction CD1
second pattern UCP
count direction CD2
supplement direction SD
supplement pattern SDP
[FIG. 11]
Edge Supplement Processing
S6305: Set pattern for continuous number count, depending on corresponding specific pattern
S6310: Count first continuous number CL and second continuous number CU by using pattern for count
S6315: One of first continuous number CL and second continuous number CU is 1?
S6325: Is first continuous number CL larger than second continuous number CU?
S6320: Supplement number SC=1
S6330: Supplement number SC=CU−1
S6335: Supplement number SC=CL/2
S6340: Set supplement pixel in enlarged image
RETURN
[FIG. 12]
(A) original image (distortion-free image)
(B) after lateral enlargement (enlarged image (distorted image))
(C) after longitudinal enlargement (distortion-free dot image)
[FIG. 13]
(F) Non supplement target
[FIG. 15]
(A) comparative example, exemplary embodiment
(B) comparative example, exemplary embodiment
[FIG. 16]
Lateral enlargement processing
specific pattern
first continuous number CL
second continuous number CU
first pattern LCP
count direction CD1
second pattern UCP
count direction CD2
supplement direction SD
supplement pattern SDP
[FIG. 17]
Lateral Enlargement Processing
S602B: Generate simple enlarged image data
S605B: Set target pixel of simple enlarged image
S610B: Is target pixel white pixel?
S625B: Do target pixel and surrounding pixels thereof form a specific pattern?
S630B: Edge supplement processing
S635B: Are all pixels of simple enlarged image selected as target pixel?
RETURN
[FIG. 18]

specific pattern
first continuous number CL
second continuous number CU
first pattern LCP
count direction CD1
second pattern UCP
count direction CD2
supplement direction SD
supplement pattern SDP

What is claimed is:

1. An image processing apparatus comprising:
a processor configured to operate as:
an acquisition unit configured to acquire original image data expressing an original image that comprises a first type pixel and a second type pixel; and
an enlargement processing unit configured to execute enlargement processing for the original image data to generate enlarged image data expressing an enlarged image that is obtained by enlarging the original image in a first direction,
wherein the enlargement processing unit comprises:
a pixel group selection unit configured to select a pixel group extending in a second direction intersecting with the first direction in the enlarge image when a specific pattern configured by the first type pixel and the second type pixel is included in the original image,
wherein the pixel group in the enlarged image comprises:
a corresponding specific pixel corresponding to a specific pixel in the original image; and
a pixel positioned in the second direction of the corresponding specific pixel,
wherein the specific pixel in the original image is a pixel corresponding to the specific first type pixel configuring the specific pattern, and
wherein the number of pixels configuring the pixel group in the enlarged image being a number corresponding to a first continuous number and a second continuous number, the first continuous number being a number that a first pattern continues from the specific pixel toward the second direction in the original image, and the second continuous number being a number that a second pattern continues from the specific pixel toward an opposite direction to the second direction; and
a setting unit configured to set a pixel configuring the pixel group in the enlarged image as the second type pixel.

2. The image processing apparatus according to claim 1,
wherein the first pattern comprises:
a first central pixel that is the first type pixel;
a first adjacency pixel that is the first type pixel adjacent to the first central pixel in the first direction; and
a second adjacency pixel that is the second type pixel adjacent to the first central pixel in an opposite direction to the first direction,
wherein the second pattern comprises:
a second central pixel that is the second type pixel; and
a third adjacency pixel that is the first type pixel adjacent to the second central pixel in the first direction, and
wherein a position of the first central pixel in the first direction and a position of the second central pixel in the first direction are the same as a position of the specific pixel in the first direction in the original image.

3. The image processing apparatus according to claim 1,
wherein the first pattern is a first partial pattern that is a part of the specific pattern, and
wherein the second pattern is a second partial pattern that is a part of the specific pattern and is different from the first partial pattern.

4. The image processing apparatus according to claim 1,
wherein the specific pattern comprises:
a first partial pattern that is adjacent to the specific pixel in the second direction; and
a second partial pattern that is adjacent to the specific pixel in an opposite direction to the second direction,
wherein the first partial pattern comprises:
a central pixel that is adjacent to the specific pixel in the second direction;
a first surrounding pixel that is the first type pixel adjacent to the central pixel in the first direction; and
a second surrounding pixel that is the second type pixel adjacent to the central pixel in an opposite direction to the first direction, and
wherein the second partial pattern comprises:
a third surrounding pixel that is the second type pixel adjacent to the specific pixel in an opposite direction to the second direction; and
a fourth surrounding pixel that is the first type pixel adjacent to the third surrounding pixel in the first direction.

5. The image processing apparatus according to claim 1,
wherein the enlargement processing unit further comprises a determination unit,
wherein the determination unit is configured to determine the number of pixels configuring the pixel group by using the second continuous number when the first continuous number is larger than the second continuous number, and
wherein the determination unit is configured to determine the number of pixels configuring the pixel group by using the first continuous number when the first continuous number is smaller than the second continuous number.

6. The image processing apparatus according to claim 1,
wherein the enlargement processing unit further comprises a target pixel selection unit configured to sequentially select a target pixel from a plurality of pixels configuring the original image,
wherein the enlargement processing unit is configured to execute one of a plurality of processing comprising first processing and second processing whenever the target pixel is sequentially selected and to generate the enlarged image data,
wherein when the target pixel includes the specific pixel, the enlargement processing unit is configured to execute the first processing, the first processing comprising selection of the pixel group by the pixel group selection unit and setting of the pixels configuring the pixel group by the setting unit, and
wherein when the target pixel do not include the specific pixel, the enlargement processing unit is configured to execute the second processing that does not comprise the selection of the pixel group by the pixel group selection unit and the setting of the pixels configuring the pixel group by the setting unit.

7. The image processing apparatus according to claim 1,
wherein the enlargement processing unit is configured to execute the enlargement processing for the original image having no distortion to generate the enlarged image data expressing the enlarged image having distortion,
wherein the image processing apparatus is for a print execution unit configured to print a dot image, wherein the processor is further configured to operate as:
a halftone processing unit configured to execute halftone processing for the enlarged image data expressing the enlarged image having distortion generated by the enlargement processing unit to generate dot data expressing a formation state of a dot for each pixel so as to generate distorted dot data expressing a distorted dot image having distortion; and
a dot image enlargement unit configured to execute processing that is different from the enlargement processing for the distorted dot data to generate distortion-free dot data expressing a distortion-free dot image having no distortion in which the distorted dot image is enlarged at least in the second direction.

8. The image processing apparatus according to claim 7,
wherein the distortion-free dot image comprises a plurality of sets of the same lines,
wherein the set of the same lines comprises two or more lines of a plurality of lines along the first direction configuring the distortion-free dot image, which two or more lines are adjacent to each other and have the same formation state of a dot of each composite pixel,
wherein the distortion-free dot data comprises compressed data expressing the set of the same lines, and
wherein the compressed data comprises:
representative line data expressing one representative line; and
data indicating that the representative line data repeats.

9. The image processing apparatus according to claim 1,
wherein the enlargement processing unit further comprises a detection unit configured to detect the specific pattern in the original image, and
wherein the enlargement processing unit is configured to execute selection of the pixel group by the pixel group selection unit and setting of the pixels configuring the pixel group by the setting unit for the detected specific pattern.

10. The image processing apparatus according to claim 1,
wherein the enlargement processing unit comprises a detection unit configured to detect a corresponding specific pattern, which corresponds to the specific pattern in the original image, in the enlarged image, and
wherein the enlargement processing unit is configured to execute selection of the pixel group by the pixel group selection unit and setting of the pixels configuring the pixel group by the setting unit for the detected corresponding specific pattern.

11. A non-transitory computer-readable medium having an image processing program stored thereon and readable by a computer, the image processing program, when executed by the computer, causes the computer to implement functions comprising:
an acquisition function of acquiring original image data expressing an original image that comprises a first type pixel and a second type pixel; and
an enlargement processing function of executing enlargement processing for the original image data to generate enlarged image data expressing an enlarged image that is obtained by enlarging the original image in a first direction,
wherein the enlargement processing function comprises:
a pixel group selection function of selecting a pixel group extending in a second direction intersecting with the first direction in the enlarge image when a specific pattern configured by the first type pixel and the second type pixel is included in the original image,
wherein the pixel group in the enlarged image comprises:
a corresponding specific pixel corresponding to a specific pixel in the original image; and
a pixel positioned in the second direction of the corresponding specific pixel,
wherein the specific pixel in the original image is a pixel corresponding to the specific first type pixel configuring the specific pattern,
wherein the number of pixels configuring the pixel group in the enlarged image is a number corresponding to a first continuous number and a second continuous number, the first continuous number being a number that a first pattern continues from the specific pixel toward the second direction in the original image, and the second continuous number being a number that a second pattern continues from the specific pixel toward an opposite direction to the second direction; and
a setting function of setting a pixel configuring the pixel group in the enlarged image as the second type pixel.

12. The non-transitory computer-readable medium according to claim 11,
wherein the first pattern comprises:
a first central pixel that is the first type pixel;
a first adjacency pixel that is the first type pixel adjacent to the first central pixel in the first direction; and
a second adjacency pixel that is the second type pixel adjacent to the first central pixel in an opposite direction to the first direction,
wherein the second pattern comprises:
a second central pixel that is the second type pixel; and
a third adjacency pixel that is the first type pixel adjacent to the second central pixel in the first direction, and
wherein a position of the first central pixel in the first direction and a position of the second central pixel in the first direction are the same as a position of the specific pixel in the first direction in the original image.

13. The non-transitory computer-readable medium according to claim 11,
wherein the first pattern is a first partial pattern that is a part of the specific pattern, and
wherein the second pattern is a second partial pattern that is a part of the specific pattern and is different from the first partial pattern.

14. The non-transitory computer-readable medium according to claim 11,
wherein the specific pattern comprises:
a first partial pattern that is adjacent to the specific pixel in the second direction; and
a second partial pattern that is adjacent to the specific pixel in an opposite direction to the second direction,
wherein the first partial pattern comprises:
a central pixel that is adjacent to the specific pixel in the second direction;
a first surrounding pixel that is the first type pixel adjacent to the central pixel in the first direction; and
a second surrounding pixel that is the second type pixel adjacent to the central pixel in an opposite direction to the first direction, and
wherein the second partial pattern comprises:
a third surrounding pixel that is the second type pixel adjacent to the specific pixel in an opposite direction to the second direction; and
a fourth surrounding pixel that is the first type pixel adjacent to the third surrounding pixel in the first direction.

15. The non-transitory computer-readable medium according to claim 11,
wherein the enlargement processing function further comprises a determination function comprising:
determining the number of pixels configuring the pixel group by using the second continuous number when the first continuous number is larger than the second continuous number; and
determining the number of pixels configuring the pixel group by using the first continuous number when the first continuous number is smaller than the second continuous number.

16. The non-transitory computer-readable medium according to claim 11,
wherein the enlargement processing function further comprises a target pixel selection function of sequentially selecting a target pixel from a plurality of pixels configuring the original image,
wherein the enlargement processing function comprises executing one of a plurality of processing comprising first processing and second processing whenever the target pixel is sequentially selected and generating the enlarged image data,
wherein when the target pixel includes the specific pixel, the enlargement processing function executes the first processing, the first processing comprising selection of the pixel group by the pixel group selection function and setting of the pixels configuring the pixel group by the setting function, and
wherein when the target pixel do not include the specific pixel, the enlargement processing function executes the second processing that does not comprise the selection of the pixel group by the pixel group selection function and the setting of the pixels configuring the pixel group by the setting function.

17. The non-transitory computer-readable medium according to claim 11,
wherein the enlargement processing function comprises executing the enlargement processing for the original image having no distortion to generate the enlarged image data expressing the enlarged image having distortion,
wherein the image processing apparatus is for a print execution unit configured to print a dot image,
wherein the image processing program further causes the computer to implement functions comprising:
a halftone processing function of executing halftone processing for the enlarged image data expressing the enlarged image having distortion generated by the enlargement processing function to generate dot data expressing a formation state of a dot for each pixel so as to generate distorted dot data expressing a distorted dot image having distortion; and
a dot image enlargement function of executing processing that is different from the enlargement processing for the distorted dot data to generate distortion-free dot data expressing a distortion-free dot image having no distortion in which the distorted dot image is enlarged at least in the second direction.

18. The non-transitory computer-readable medium according to claim 17,
wherein the distortion-free dot image comprises a plurality of sets of the same lines,
wherein the set of the same lines comprises two or more lines of a plurality of lines along the first direction configuring the distortion-free dot image, which two or more lines are adjacent to each other and have the same formation state of a dot of each composite pixel,
wherein the distortion-free dot data comprises compressed data expressing the set of the same lines, and
wherein the compressed data comprises:
representative line data expressing one representative line; and
data indicating that the representative line data repeats.

19. The non-transitory computer-readable medium according to claim 11,
wherein the enlargement processing function further comprises a detection function of detecting the specific pattern in the original image, and
wherein the enlargement processing function executes selection of the pixel group by the pixel group selection function and setting of the pixels configuring the pixel group by the setting function for the detected specific pattern.

20. The non-transitory computer-readable medium according to claim 11,
wherein the enlargement processing function comprises a detection function of detecting a corresponding specific pattern, which corresponds to the specific pattern in the original image, in the enlarged image, and
wherein the enlargement processing function executes selection of the pixel group by the pixel group selection function and setting of the pixels configuring the pixel group by the setting function for the detected corresponding specific pattern.

* * * * *